(12) United States Patent
Osakabe et al.

(10) Patent No.: US 11,613,125 B2
(45) Date of Patent: Mar. 28, 2023

(54) LIQUID JETTING APPARATUS

(71) Applicant: BROTHER KOGYO KABUSHIKI KAISHA, Nagoya (JP)

(72) Inventors: Yoshinori Osakabe, Seto (JP); Tomohisa Higuchi, Nagoya (JP); Akira Shinoda, Obu (JP); Akinori Igarashi, Kasugai (JP); Suguru Tomoguchi, Okazaki (JP); Hisaki Sakurai, Aichi-ken (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 17/513,231

(22) Filed: Oct. 28, 2021

(65) Prior Publication Data

US 2022/0048294 A1 Feb. 17, 2022

Related U.S. Application Data

(63) Continuation of application No. 16/993,536, filed on Aug. 14, 2020, now Pat. No. 11,472,187, which is a
(Continued)

(30) Foreign Application Priority Data

Apr. 8, 2014 (JP) .............................. JP2014-079373

(51) Int. Cl.
*B41J 2/175* (2006.01)
*G06K 15/10* (2006.01)
(Continued)

(52) U.S. Cl.
CPC ............. *B41J 2/175* (2013.01); *B41J 2/1752* (2013.01); *B41J 2/17503* (2013.01);
(Continued)

(58) Field of Classification Search
CPC B41J 2/17523; B41J 2/17506; B41J 2/17553; B41J 2/17503; B41J 2/17513;
(Continued)

(56) References Cited

U.S. PATENT DOCUMENTS 5,686,947 A 11/1997 Murray et al.
6,048,055 A 4/2000 Hakkaku
(Continued)

FOREIGN PATENT DOCUMENTS

CN 103568581 A 2/2004
CN 1756665 A 4/2006
(Continued)

OTHER PUBLICATIONS

Notification of First Office Action issued in related Chinese Patent Application Serial No. 201510132996.6, dated Jun. 8, 2016 (English translation attached).
(Continued)

*Primary Examiner* — Thinh H Nguyen
(74) *Attorney, Agent, or Firm* — Merchant & Gould P.C.

(57) ABSTRACT

A liquid jetting apparatus includes a casing, a tank formed with a liquid storage chamber which stores liquid, an inlet which allows the liquid to be poured into the liquid storage chamber, and a liquid outflow channel which allows the liquid to flow out from the liquid storage chamber, a conveying mechanism which conveys a recording medium along a conveying path extending in a front-rear direction, a carriage which moves in a left-right direction, and a head mounted on the carriage and having a nozzle which jets the liquid onto the recording medium conveyed by the conveying mechanism. The tank, the conveying path, and the carriage are arranged inside the casing, the tank is arranged outside the conveying path in the left-right direction, and at
(Continued)

least a part of the tank is arranged inside both ends of a movement area of the carriage in the left-right direction.

19 Claims, 12 Drawing Sheets

Related U.S. Application Data continuation of application No. 15/595,127, filed on May 15, 2017, now Pat. No. 10,744,776, which is a continuation of application No. 15/058,576, filed on Mar. 2, 2016, now Pat. No. 9,649,845, which is a continuation of application No. 14/666,063, filed on Mar. 23, 2015, now Pat. No. 9,302,516.

(51) Int. Cl.
*B41J 29/02* (2006.01)
*B41J 2/005* (2006.01)
*B41J 2/01* (2006.01)
*B41J 2/17* (2006.01)

(52) U.S. Cl.
CPC ....... *B41J 2/17506* (2013.01); *B41J 2/17513* (2013.01); *B41J 2/17553* (2013.01); *B41J 29/02* (2013.01); *B41J 29/023* (2013.01); *G06K 15/105* (2013.01); *B41J 2/005* (2013.01); *B41J 2/01* (2013.01); *B41J 2/17* (2013.01)

(58) Field of Classification Search
CPC ........ B41J 2/1752; B41J 29/02; B41J 29/023; B41J 2/105; B41J 2/005; B41J 2/01; B41J 2/17; G06K 15/105
See application file for complete search history.

(56) References Cited

U.S. PATENT DOCUMENTS

| | | | |
|---|---|---|---|
| 6,378,997 B1 | 4/2002 | Nitta | |
| 6,565,197 B1 | 5/2003 | Murray et al. | |
| 7,469,981 B2 * | 12/2008 | Katsuyama | B41J 2/1755 399/113 |
| 8,007,064 B2 | 8/2011 | Tsuchiya | |
| 8,485,653 B2 | 7/2013 | Katsuyama et al. | |
| 8,534,791 B2 | 9/2013 | Takata et al. | |
| 9,302,516 B2 | 4/2016 | Osakabe | |
| 9,421,781 B2 | 8/2016 | Kimura et al. | |
| 2002/0113850 A1 | 8/2002 | Wheeler et al. | |
| 2006/0023005 A1 | 2/2006 | Katsuyama et al. | |
| 2006/0092241 A1 | 5/2006 | Sadano | |
| 2006/0279594 A1 | 12/2006 | Hasegawa | |
| 2007/0229619 A1 | 10/2007 | Sugahara et al. | |
| 2008/0297571 A1 | 12/2008 | Umeda | |
| 2009/0074494 A1 | 3/2009 | Katsuyama et al. | |
| 2010/0315470 A1 | 12/2010 | Takei et al. | |
| 2011/0242158 A1 | 10/2011 | Takata et al. | |
| 2011/0298873 A1 | 12/2011 | Katsuyama et al. | |
| 2013/0169720 A1 | 7/2013 | Nakamura et al. | |
| 2013/0176367 A1 | 7/2013 | Morino et al. | |
| 2013/0213440 A1 | 8/2013 | Ohta | |
| 2014/0022314 A1 | 1/2014 | Nozawa | |
| 2014/0043408 A1 | 2/2014 | Kudo et al. | |
| 2014/0063150 A1 | 3/2014 | Miyazaki et al. | |
| 2014/0104349 A1 | 4/2014 | Kimura et al. | |
| 2014/0375731 A1 | 12/2014 | Miyazaki et al. | |
| 2015/0174907 A1 | 6/2015 | Kimura et al. | |
| 2015/0306882 A1 | 10/2015 | Kudo et al. | |
| 2016/0159099 A1 | 6/2016 | Kudo et al. | |

FOREIGN PATENT DOCUMENTS

| | | |
|---|---|---|
| CN | 101045392 A | 10/2007 |
| CN | 102205702 A | 10/2011 |
| CN | 102381042 A | 3/2012 |
| CN | 103158363 A | 6/2013 |
| CN | 103660564 A | 3/2014 |
| JP | 7-205450 A | 8/1995 |
| JP | 11-78048 A | 3/1999 |
| JP | 11-504874 A | 5/1999 |
| JP | 11-254700 A | 9/1999 |
| JP | 2002-001993 A | 2/2002 |
| JP | 2002-307723 A | 10/2002 |
| JP | 2008-296508 A | 12/2008 |
| JP | 2012-35526 A | 2/2012 |
| JP | 2013-139140 A | 7/2013 |
| JP | 2013-193215 A | 9/2013 |
| JP | 2014-24349 A | 2/2014 |
| JP | 2014-46567 A | 3/2014 |
| JP | 2014-54824 A | 3/2014 |
| JP | 2014-58098 A | 4/2014 |
| JP | 2014-079908 A | 5/2014 |
| WO | 2004/050373 A1 | 6/2004 |
| WO | 2013-085023 A1 | 6/2013 |
| WO | 2014/024458 A1 | 2/2014 |

OTHER PUBLICATIONS

Second Chinese Office Action from corresponding Chinese Patent Application No. 201510132996.6, dated Feb. 10, 2017.
Notification of Third Chinese Office Action from corresponding Chinese Patent Application No. 201510132996.6, dated Sep. 4, 2017.
Notice of Reasons for Rejection issued in related Japanese Patent Application No. 2014-079373, dated Dec. 26, 2017.
U.S. Office Action (Notice of Allowance) issued in related U.S. Appl. No. 15/611,960, dated Feb. 12, 2018.
Notification of the Fourth Office Action issued in related Chinese Patent Application No. 201510132996.6, dated Mar. 22, 2018.
Restriction Requirement issued in grandparent U.S. Appl. No. 15/595,127 dated Jul. 11, 2018.
Notice of Reasons for Rejection issued in related Japanese Patent Application No. 2014-079373, dated Apr. 24, 2018.
Non-Final Rejection issued in grandparent U.S. Appl. No. 15/595,127 dated Feb. 19, 2019.
Office Action (Notice of Decision of Refusal) issued in related Japanese Patent Application No. 2014-079373, dated Dec. 18, 2018.
Office Action (Decision of Rejection) issued in related Chinese Patent Application No. 201510132996.6, dated Mar. 22, 2019.
Final Rejection issued in grandparent U.S. Appl. No. 15/595,127 dated Jun. 13, 2019.
Advisory Action issued in grandparent U.S. Appl. No. 15/595,127 dated Oct. 7, 2019.
Non-Final Rejection issued in grandparent U.S. Appl. No. 15/595,127 dated Nov. 1, 2019.
Notice of Allowance issued in grandparent U.S. Appl. No. 15/595,127 dated Apr. 1, 2020.
Office Action (Notice of Reasons for Refusal) issued in corresponding Japanese Patent Application No. 2019-048105, dated Jun. 5, 2020.
Notification of Reexamination of Chinese Patent Application No. 201510132996.6 dated Jun. 22, 2020.
Notification of First Office Action of Chinese Patent Application No. 201910898317.4, dated Jul. 1, 2020.
Decision of Reexamination issued in corresponding Chinese Patent Application No. 201510132996.6, dated Oct. 27, 2020.
Decision of Refusal issued in corresponding Japanese Patent Application No. 2019-048105, dated Dec. 25, 2020.
Notification of the Second Office Action with Search Report issued in corresponding Chinese Patent Application No. 201910898317.4, dated Jan. 18, 2021.
Third Office Action issued in corresponding Chinese Patent Application No. 201910898317.4, dated Jun. 30, 2021.
Non-Final Office Action dated Oct. 15, 2021 in parent U.S. Appl. No. 16/993,536.

(56) References Cited

OTHER PUBLICATIONS

Decision of Rejection issued in corresponding Chinese Patent Application No. 201910898317.4, dated Dec. 2, 2021.

* cited by examiner

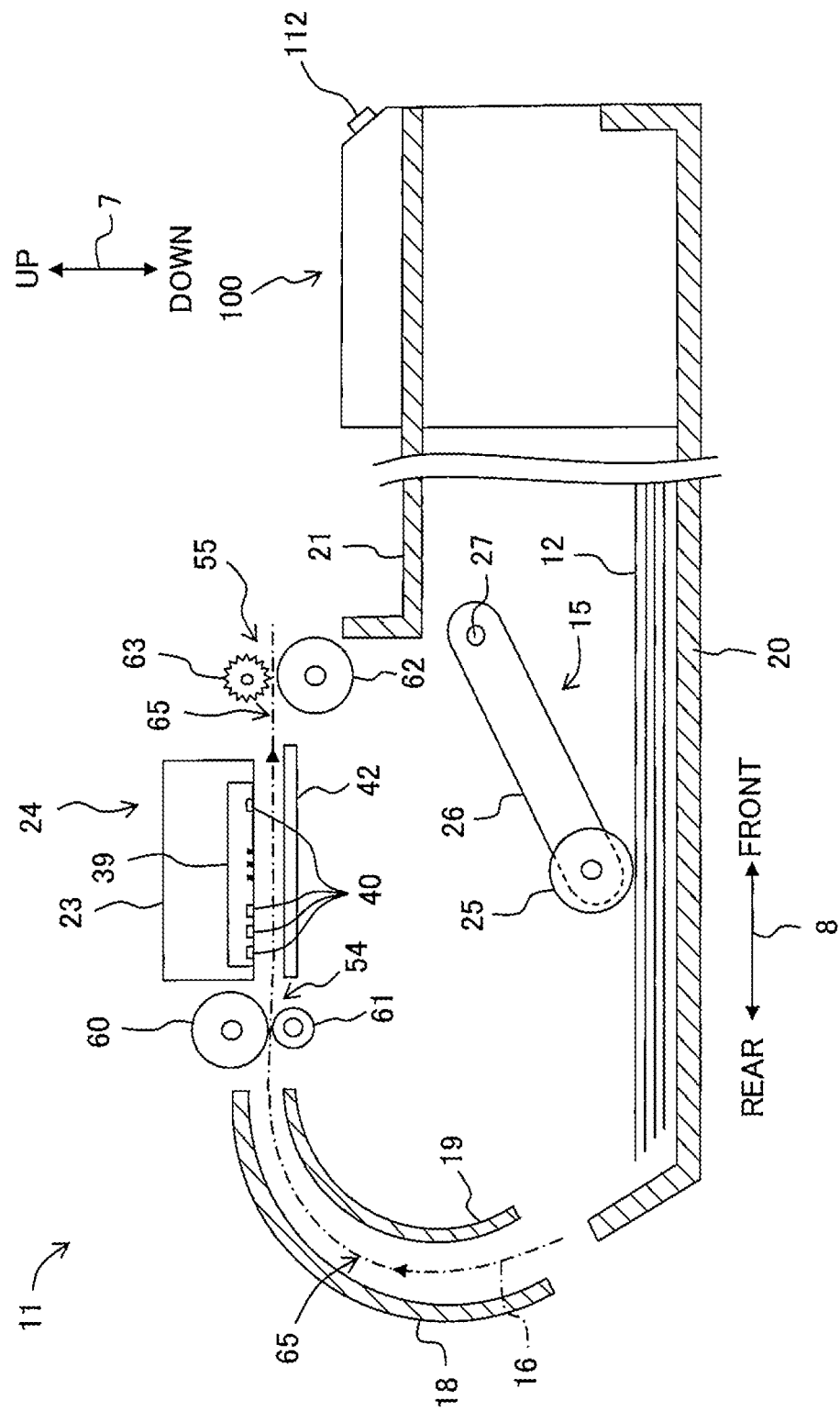

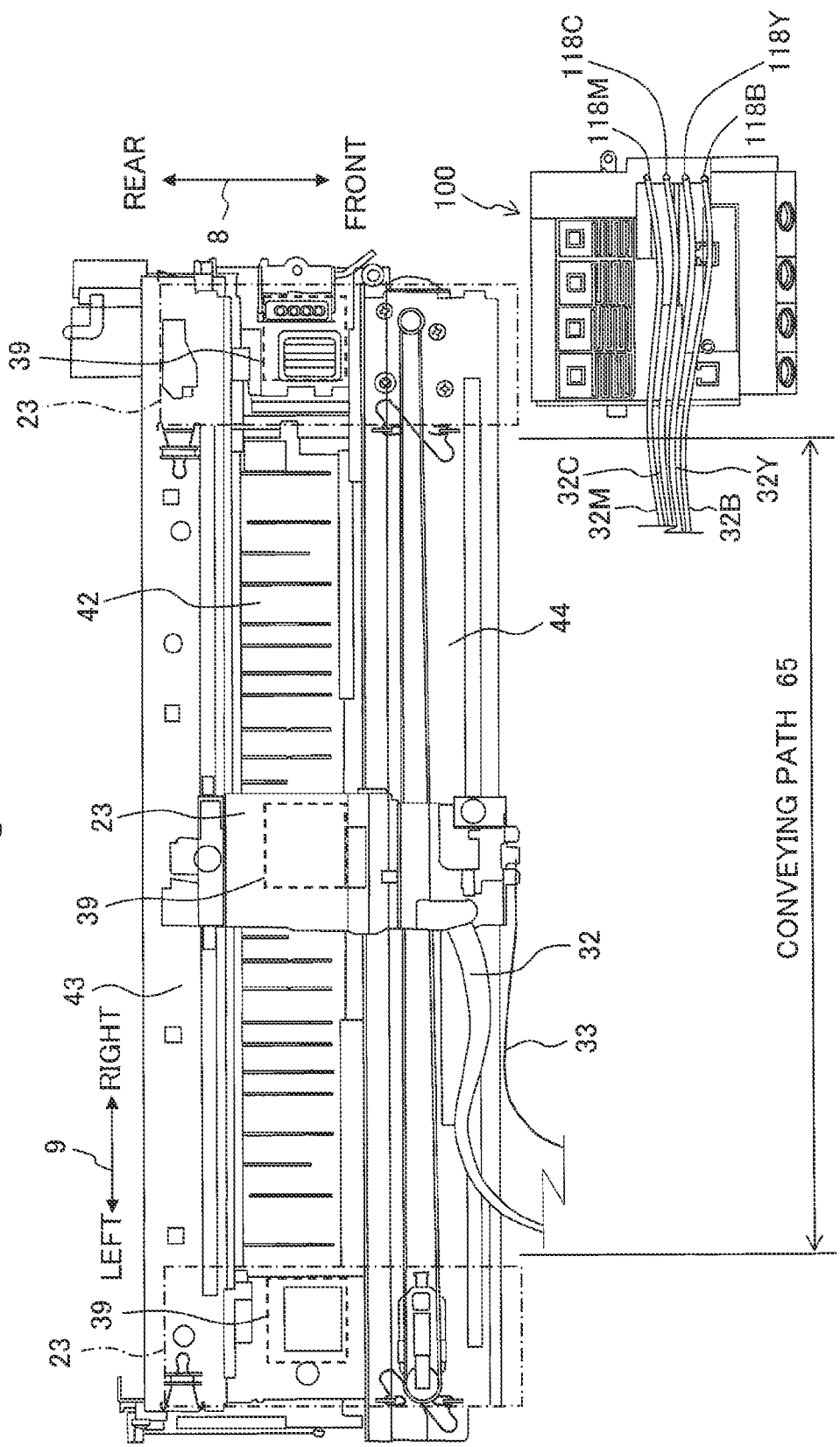

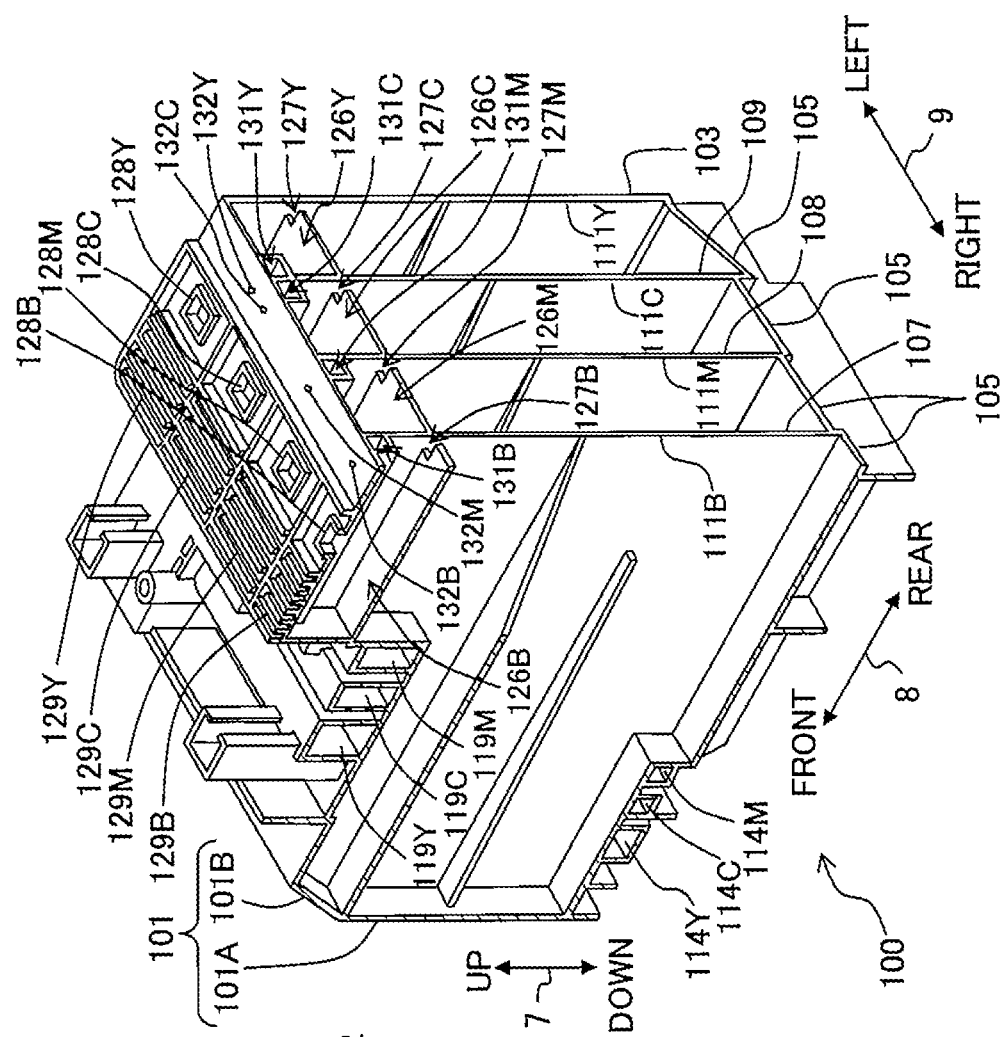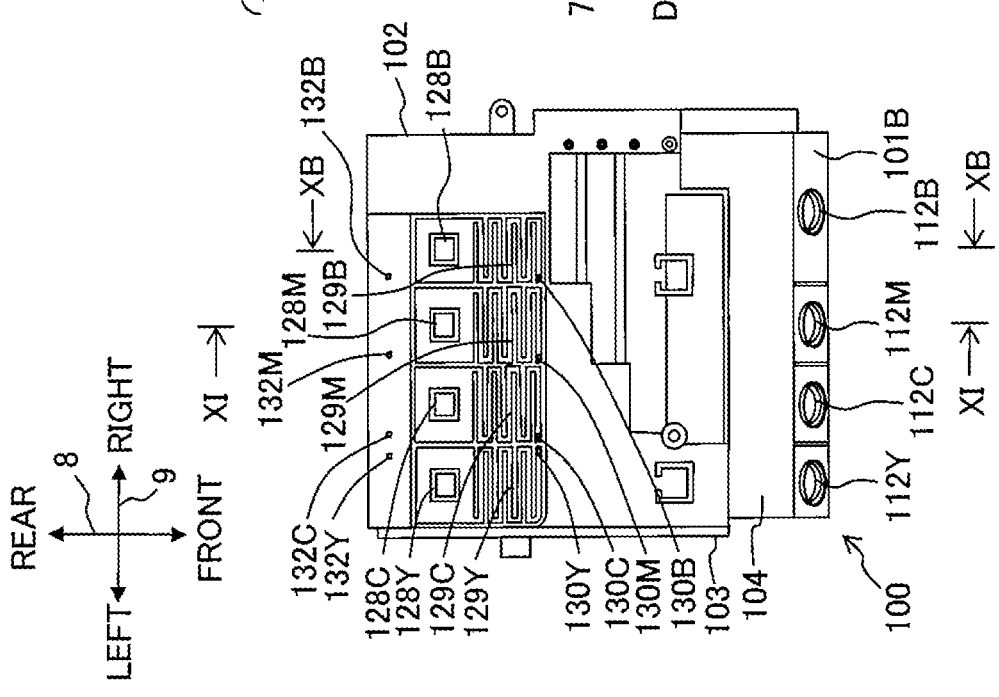

LIQUID JETTING APPARATUS

CROSS REFERENCE TO RELATED APPLICATION

The present application is a continuation of U.S. patent application Ser. No. 16/993,536 filed Aug. 14, 2020, which is a continuation of U.S. patent application Ser. No. 15/595,127, filed May 15, 2017, which is a continuation of U.S. patent application Ser. No. 15/058,576, filed Mar. 2, 2016, which is a continuation of U.S. patent application Ser. No. 14/666,063, filed Mar. 23, 2015, both of which further claim priority from Japanese Patent Application No. 2014-079373 filed on Apr. 8, 2014, the disclosure of all of which are incorporated herein by reference in their entirety.

BACKGROUND

Field of the Invention

The present teaching relates to a liquid jetting apparatus which jets liquid supplied from a tank which is refillable with the liquid.

Description of the Related Art

A printer (an example of a liquid jetting apparatus) including a large capacity tank which is refillable with ink and a recording head which records an image on a recording paper by jetting the ink supplied from the tank through nozzles has hitherto been known.

SUMMARY

In one exemplary arrangement of the conventional printer, a tank is arranged outside a paper conveying path and both ends of a movement area of a carriage in a movement direction of the carriage. Moreover, no other member is arranged above the tank. In another exemplary arrangement of the conventional printer, a tank is arranged inside a paper conveying path and both ends of a movement area of a carriage in a movement direction of the carriage.

In the one exemplary arrangement of the conventional printer, an access to the tank is easy, but a dimension of an apparatus along the movement direction of the carriage must be long. Moreover, since no other member has been arranged above the tank, a layout of members in the apparatus is inefficient. On the other hand, in the another exemplary arrangement of the conventional printer, a dimension of an apparatus along the movement direction of the carriage can be short, but the conveying path and the tank must be arranged separately in an up-down direction, and therefore, an outer size of an apparatus becomes high. Moreover, since another member has been arranged above the tank, an access to an inlet of the tank is not possible without drawing the tank frontward.

The present teaching has been made in view of the abovementioned circumstances, and an object of the present teaching is to provide a thin and downsized liquid jetting apparatus. Moreover, another object of the present teaching is to provide a liquid jetting apparatus in which an access to a tank is easy.

According to an aspect of the present teaching, there is provided a liquid jetting apparatus including: a casing; a tank formed with a liquid storage chamber configured to store liquid, an inlet configured to allow the liquid to be poured into the liquid storage chamber, and a liquid outflow channel configured to allow the liquid to flow out from the liquid storage chamber; a conveying mechanism configured to convey a recording medium along a conveying path extending in a front-rear direction; a carriage configured to move in a left-right direction, at a position above the conveying path in an up-down direction and facing the conveying path; and a head mounted on the carriage and having a nozzle configured to jet the liquid flowed out from the liquid storage chamber through the liquid outflow channel onto the recording medium conveyed by the conveying mechanism, wherein the tank, the conveying path, and the carriage are arranged inside the casing, the tank is arranged outside the conveying path in the left-right direction, and at least a part of the tank is arranged inside both ends of a movement area of the carriage in the left-right direction.

According to the present teaching, a thin and downsized liquid jetting apparatus is realized by making an outer shape of the apparatus small in the left-right direction and the up-down direction. Moreover, since it is possible to pour the liquid obliquely downward from outside of a side wall of the casing to the inlet, an access to the tank at the time of refilling tank with the liquid is easy.

BRIEF DESCRIPTION OF THE DRAWINGS

FIG. 2 is a vertical cross-sectional view schematically showing an internal structure of a printer unit.

FIG. 3 is a plan view showing an arrangement of a carriage and an ink tank.

FIG. 10A is a plan view of the ink tank, and FIG. 10B is a perspective view of a cross-section along a line XB-XB in FIG. 10A.

DETAILED DESCRIPTION OF THE EMBODIMENTS

Figure 1A:
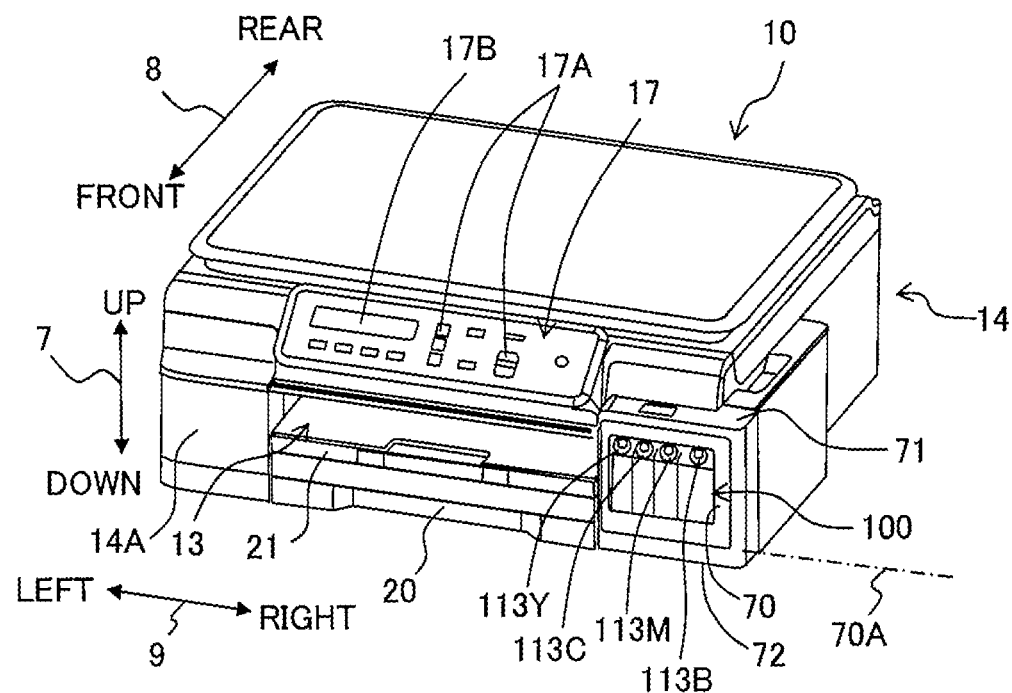
FIG. 1A is an external perspective view of a multi-function peripheral showing a cover in a closed state.

An embodiment of the present teaching will be described below. However, the embodiment described below is merely an example of the present teaching, and it is needless to mention that it is possible to make appropriate changes in the embodiment of the present teaching without departing from the scope of the teaching. Moreover, in the following description, an up-down direction 7 is defined with reference to a state in which a multi-function peripheral 10 is usably installed (a state in FIGS. 1A and 1B, sometimes referred to as "usable state") or with reference to a posture in which the multi-function peripheral 10 is usably installed (a posture in FIGS. 1A and 1B, sometimes referred to as "usable posture"). A front-rear direction 8 is defined with a side of the multi-function peripheral 10 formed with an opening 13 as a front side (front surface), and a left-right direction 9 is defined by viewing the multi-function peripheral 10 from the front side (front surface). An upward direction is a component of the up-down direction 7 and a downward direction is a component of the up-down direction 7. The upward direction and the downward direction are mutually opposite directions. Similarly, each of a leftward direction and a rightward direction is a component of the left-right direction 9, and the leftward direction and the rightward direction are mutually opposite directions. Each of a frontward direction and a rearward direction is a component of the front-rear direction 8, and the frontward direction and the rearward direction are mutually opposite directions. In the present embodiment, the up-down direction 7 corresponds to a vertical direction, and the front-rear direction 8 and the left-right direction 9 correspond to a horizontal direction.

<Overall Arrangement of Multi-Function Peripheral 10>

Figure 1B:
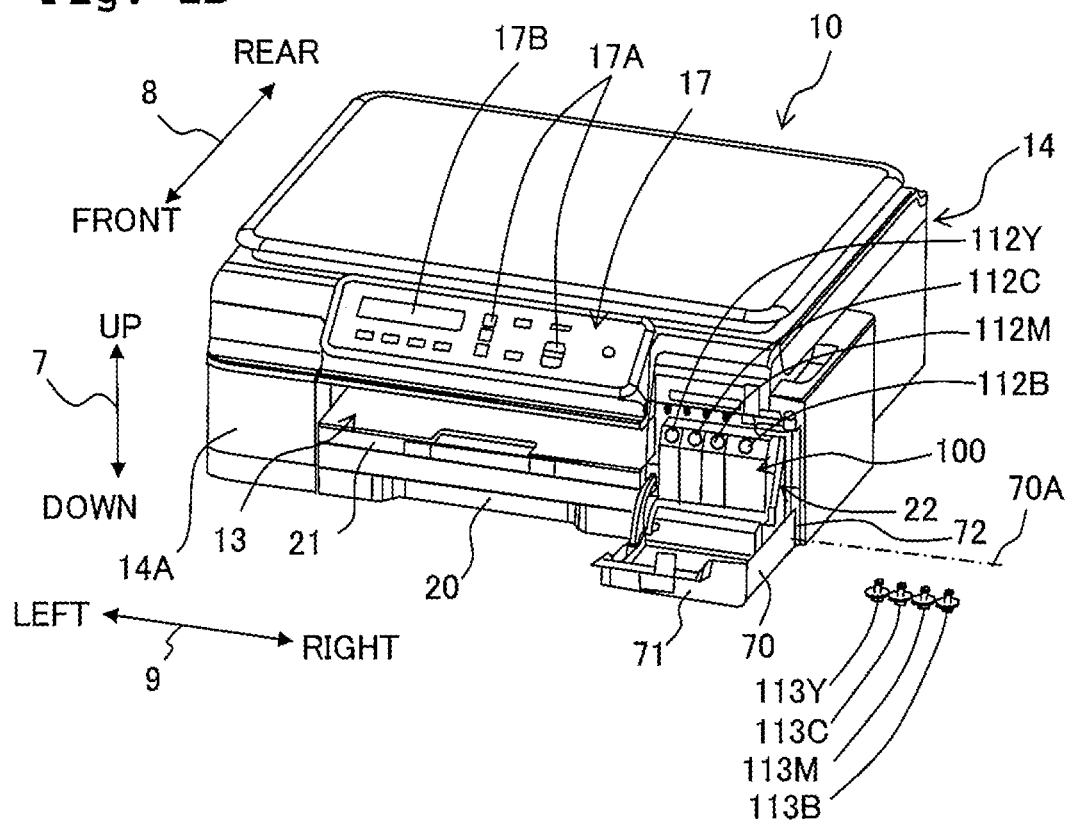
FIG. 1B is an external perspective view of the multi-function peripheral showing the cover in an open state.

A multi-function peripheral 10, as shown in FIG. 1A and FIG. 1B, is formed to be substantially rectangular parallelepiped. The multi-function peripheral 10 includes a printer unit 11 which records an image on a paper 12 (refer to FIG. 2) by an ink-jet recording method at a lower portion thereof. The printer unit 11, as shown in FIG. 2, includes a feeding section 15, a feeding tray 20, a discharge tray 21, a conveying roller section 54, a recording section 24, a discharge roller section 55, a platen 42, and an ink tank 100 (an example of a tank). Moreover, the multi-function peripheral 10 includes a flatbed scanner at an upper portion thereof, and has various functions such as a scanner function, a facsimile function, and a copy function, in addition to a print function. The multi-function peripheral 10 is an example of a liquid jetting apparatus or a liquid consuming apparatus. Moreover, the conveying roller section 54 and the discharge roller section 55 are an example of a conveying mechanism.

A casing 14 which defines an external shape of the multi-function peripheral 10 has a thin flat parallelepiped shape with a dimension in the up-down direction 7 shorter as compared with a dimension in the front-rear direction 8 and a dimension in the left-right direction 9. A state, in which a bottom surface of the casing 14 is in contact with a mounting surface such as a plate or a board, is a normal installed state of the multi-function peripheral 10. A front wall 14A of the casing 14 is provided with an opening 13, an operation panel 17, and a cover 70.

The opening 13 is formed at a center in the left-right direction 9 and a lower side in the up-down direction 7 of the front wall 14A (an example of a side wall) of the casing 14. An internal space of the casing 14 is spread rearward in the front-rear direction 8 from the opening 13. The feeding tray 20 and the discharge tray 21 can be inserted into and drawn out from the internal space through the opening 13.

The operation panel 17 is provided above the opening 13 in the front wall 14A of the casing 14. The operation panel 17 is provided with an input button 17A (an example of an input section) and a liquid-crystal display 17B (an example of a display section) on a front surface thereof. The operation panel 17 is formed to be longer in the left-right direction 9, and a surface thereof is directed to be inclined upward. The operation panel 17 is arranged above the ink tank 100 that will be described later.

The cover 70 is provided on a side (right side in FIG. 1A and FIG. 1B) of the opening 13 in the front wall 14A of the casing 14. The cover 70 opens and closes an opening 22 that is formed in the front wall 14A of the casing 14. In a case of refilling the ink tank 100 with an ink, a user can access the ink tank 100 provided inside the casing 14, through the opening 22.

<Feeding Tray 20 and Discharge Tray 21>

The feeding tray 20 (an example of a paper feeding cassette), as shown in FIG. 1A and FIG. 1B, can be inserted into and drawn out from the multi-function peripheral 10 by the user, in the front-rear direction 8 through the opening 13 formed in the front wall 14A of the casing 14. In FIG. 1A and FIG. 1B, a state in which the feeding tray 20 is installed in the casing 14 is shown, and the feeding tray 20 is removed from the casing 14 by being drawn out frontward in the front-rear direction 8. The feeding tray 20 is capable of supporting a plurality of papers 12 that are stacked. The discharge tray 21 is arranged above the feeding tray 20, and is inserted into and drawn out from the casing 14 together with the feeding tray 20. At an upper side of the discharge tray 21, there is an internal space which is extended rearward from the opening 13. The discharge tray 21 supports the paper 12 discharged from a space between the recording section 24 and the platen 42 by the discharge roller section 55.

<Feeding Section 15>

The feeding section 15 feeds the paper 12 supported by the feeding tray 20 to a conveying path 65. The feeding section 15, as shown in FIG. 2, includes a feeding roller 25, a feeding arm 26, and a shaft 27. The feeding roller 25 is rotatably supported by a front-end side of the feeding arm 26. The feeding roller 25 rotates in a direction of conveying the paper 12 in a conveying direction 16 by reverse rotation of a conveying motor (not shown in the diagram). In the following description, rotation of the feeding roller 25, a conveying roller 60, and a discharge roller 62 in a direction of conveying the paper 12 in the conveying direction 16 will be referred to as "normal rotation". The feeding arm 26 is pivotally supported by the shaft 27 which is supported by a frame of the printer unit 11. The feeding ram 26 is biased by an elastic force of a spring etc. or due to a weight of the feeding arm 26, such that the feeding arm 26 is pivoted toward the feeding tray 20.

<Conveying Path 65>

The conveying path 65 is formed inside the casing 14. As shown in FIG. 2, a part of the conveying path 65 is a space formed by an outer guide member 18 and an inner guide member 19 which face each other with a predetermined spacing distance intervening therebetween inside the printer unit 11. The conveying path 65 is a path that is extended from a rear end portion of the feeding tray 20 toward a rear side of the printer unit 11. Moreover, the conveying path 65 is a path that makes a U-turn while being extended from a lower side to an upper side at the rear side of the printer unit 11, and reaches the discharge tray 21 via the space between the recording section 24 and the platen 42. The conveying path 65 between the conveying roller section 54 and the discharge roller section 55, as shown in FIG. 2 and FIG. 3, is provided at a substantially central portion in the left-right direction 9 of the multi-function peripheral 10, and is extended in the front-rear direction 8. Although it is not shown in FIG. 3, the feeding tray 20 and the discharge tray 21 are arranged at positions overlapping with an area of the conveying path 65 along the left-right direction 9, when viewed from the up-down direction 7. The conveying direction 16 of the paper 12 in the conveying path 65 is indicated by a dashed-dotted line in FIG. 2.

<Conveying Roller Section 54>

The conveying roller section 54, as shown in FIG. 2, is arranged at an upstream side of the recording section 24 in the conveying direction 16. The conveying roller section 54 includes the conveying roller 60 and a pinch roller 61 which are facing mutually. The conveying roller 60 is driven by a conveying motor. The pinch roller 61 rotates following the rotation of the conveying roller 60. The paper 12 is conveyed in the conveying direction 16 while being pinched between the pinch roller 61 and the conveying roller 60 which is rotating positively by normal rotation of the conveying motor.

<Discharge Roller Section 55>

The discharge roller section 55, as shown in FIG. 2, is arranged at a downstream side of the recording section 24 in the conveying direction 16. The discharge roller section 55 includes the discharge roller 62 and a spur 63 which are facing mutually. The discharge roller 62 is driven by the conveying motor. The spur 63 rotates following the rotation of the discharge roller 62. The paper 12 is conveyed in the conveying direction 16 while being pinched between the spur 63 and the discharge roller 62 which is rotating positively by normal rotation of the conveying motor.

<Recording Section 24>

The recording section 24, as shown in FIG. 2, is arranged between the conveying roller section 54 and the discharge roller section 55 in the conveying direction 16. Moreover, the recording section 24 is arranged to face the platen 42 in the up-down direction, sandwiching the conveying path therebetween. In other words, the recording section 24 is arranged above the conveying path 65 in the up-down direction 7, to face the conveying path 65. The recording section 24 includes a carriage 23 and a recording head 39.

The carriage 23, as shown in FIG. 3 is supported by guide rails 43 and 44 extended in the left-right direction 9 respectively at positions isolated in the front-rear direction 8. The guide rails 43 and 44 are supported by the frame of the printer unit 11. The carriage 23 is connected to a known belt mechanism that is provided for the guide rail 44. The belt mechanism is driven by a carriage motor (not shown in the diagram). In other words, the carriage 23 connected to the belt mechanism reciprocates in the left-right direction 9 by driving of the carriage motor. A movement range of the carriage 23, as shown by alternate long and short dash lines in FIG. 3, is extended to the left and right of the conveying path 65 in the left-right direction 9.

Moreover, ink tubes 32 which connect the ink tank 100 and the recording head 39, and a flexible flat cable 33 which electrically connects the recording head 39 and a control substrate on which a control section (not shown in the diagram) is mounted, are extended from the carriage 23. The ink tubes 32 supply inks stored in the ink tank 100 to the recording head 39. More elaborately, four ink tubes 32B, 32M, 32C, and 32Y (collectively referred to as "ink tube 32"), through which the inks of four colors (black, magenta, cyan, and yellow colors) are distributed, are extended from the ink tank 100, and are connected to the carriage 23 in a bundled form. The flexible flat cable 33 transmits a control signal outputted from the control section, to the recording head 39.

The recording head 39, as shown in FIG. 2, is installed on the carriage 23. A plurality of nozzles 40 is formed in a lower surface of the recording head 39. Front ends of the plurality of nozzles 40 are exposed through the lower surface of the recording head 39 and the carriage 23 on which the recording head 39 is installed. In the following description, the surface through which the front ends of the nozzles 40 are exposed will be referred to as a "nozzle surface". The recording head 39 jets ink as fine ink droplets through the nozzles 40. In a process of the movement of the carriage 23, the recording head 39 jets ink droplets toward the paper 12 supported by the platen 42. Accordingly, an image is recorded on the paper 12.

<Platen 42>

The platen 42, as shown in FIG. 2 and FIG. 3, is arranged between the conveying roller section 54 and the discharge roller section 55 in the conveying direction 16. The platen 42 is arranged to face the recording section 24 in the up-down direction 7, and supports the paper 12 conveyed by the conveying roller section 54 from a lower side.

<Ink Tank 100>

The ink tank 100, as shown in FIG. 1A and FIG. 1B, is accommodated inside the casing 14. The ink tank 100 is fixed to the multi-function peripheral 10 such that it cannot be removed easily from the multi-function peripheral 10.

A front surface of the ink tank 100 is exposed outside the multi-function peripheral 10 through an opening 22 that is formed in the front wall 14A of the casing 14. The opening 22 is adjacent to the opening 13 in the left-right direction 9. Moreover, the casing 14 is provided with a cover 70 which is pivotable between a covered position of covering the opening 22 (refer to FIG. 1A), and an exposed position of exposing the opening 22 (refer to FIG. 1B). The cover 70 is supported by the casing 14 to be pivotable around a pivot axis 70A extended in the left-right direction 9 at a lower end side in the up-down direction 7. The pivot axis 70A is provided at a position closer to a lower end 72 than to an upper end 71 of the cover 70 when the opening 22 is closed by the cover 70 (a state shown in FIG. 1A).

Figure 4:
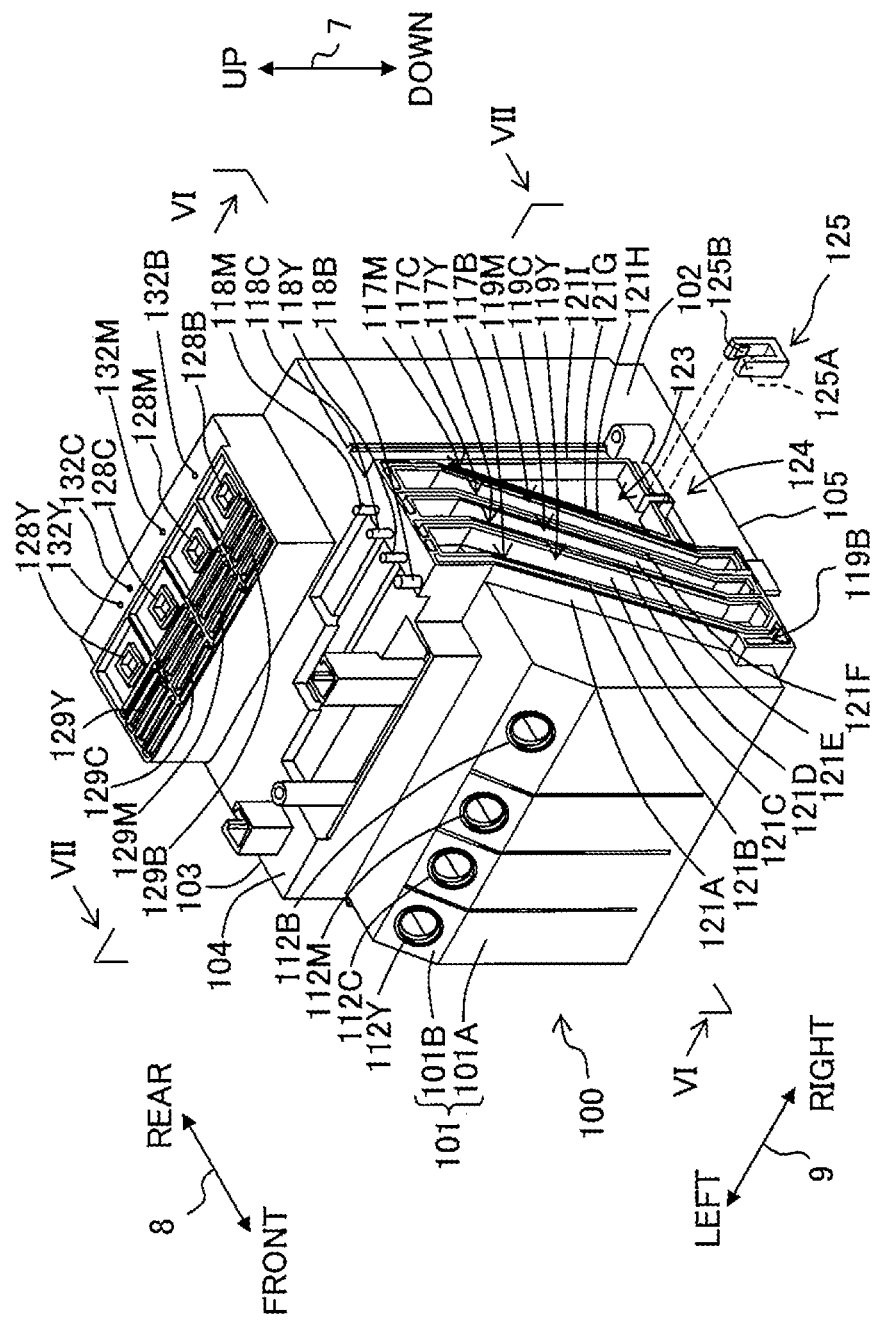
FIG. 4 is a front perspective view of the ink tank.
Figure 5:
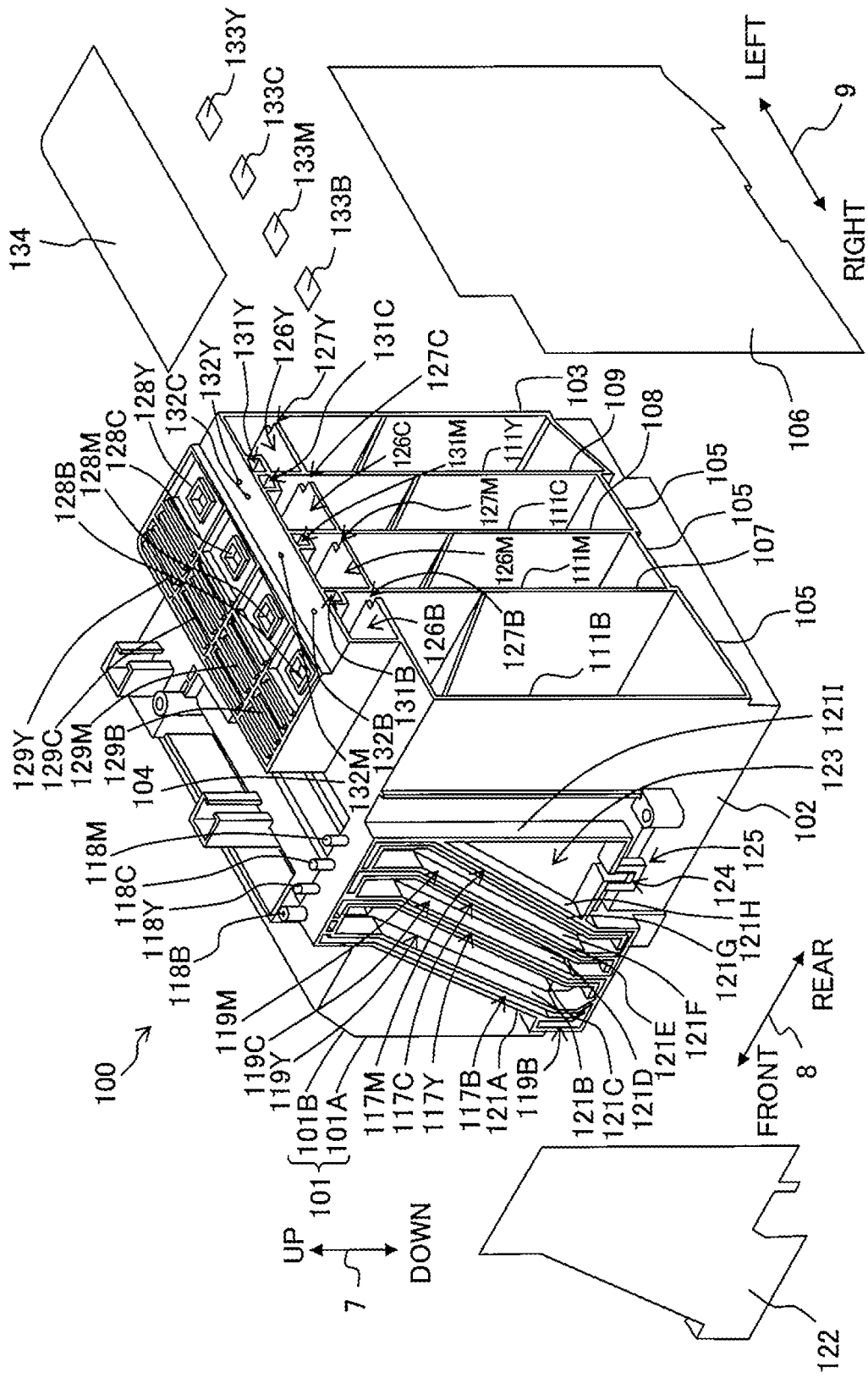
FIG. 5 is a rear perspective view of the ink tank.

The ink tank 100, as shown in FIG. 4 and FIG. 5, has a substantially rectangular parallelepiped shape. The ink tank 100 has a front wall 101, a right wall 102, a left wall 103, an upper wall 104, and a lower wall 105. The front wall 101 includes an erected wall 101A which is extended substantially in the up-down direction 7 from the lower wall 105, and an inclined wall 101B which is connected to an upper end of the erected wall 101A and is inclined with respect to the up-down direction 7 and the front-rear direction 8. Moreover, an upper surface of the lower wall 105 which forms a bottom surface of an ink chamber 111 that will be described later is inclined downward toward right side. On the other hand, a rear surface of the ink tank 100 is open. Moreover, the rear surface of the ink tank 100 is sealed by a film 106 being welded to rear-end surfaces of the lower wall 105, the upper wall 104, the left wall 103, and the right wall 102. In other words, the film 106 forms a rear wall of the ink tank 100.

<Ink Chamber 111>

A plurality of partition walls 107, 108, and 109 which demarcate an internal space is provided at an interior of the ink tank 100 as shown in FIG. 5. Each of the partition walls 107, 108, and 109 is extended in the up-down direction 7 and the front-rear direction 8, and is connected to the front wall 101, the upper wall 104, the lower wall 105, and the film 106. Moreover, the partition walls 107, 108, and 109 are provided to be apart from each other in the left-right direction 9. As a result, an internal space of the ink tank 100 is partitioned into four ink chambers 111B, 111M, 111C, and 111Y which are adjacent in the left-right direction 9. The ink chamber 111 is an example of a liquid storage chamber that stores ink to be jetted through the nozzles 40.

The ink chamber 111B is a space defined by the front wall 101, the right wall 102, the upper wall 104, the lower wall 105, the film 106, and the partition wall 107. The ink chamber 111M is a space defined by the front wall 101, the upper wall 104, the lower wall 105, the film 106, and the partition walls 107 and 108. The ink chamber 111C is a space defined by the front wall 101, the upper wall 104, the lower wall 105, the film 106, and the partition walls 108 and 109. The ink chamber 111Y is a space defined by the front wall 101, the left wall 103, the upper wall 104, the lower wall 105, the film 106, and the partition wall 109.

In the following description, the ink chambers 111B, 111M, 111C, and 111C are collectively referred to as "ink chambers 111" sometimes. Moreover, reference numerals having different alphabets as a suffix (B, M, C, and Y) are assigned to components corresponding to the ink chambers 111, and are collectively referred to with the alphabets omitted sometimes.

Inks of different colors are stored in the ink chambers 111 respectively. Concretely, a black ink is stored in the ink chamber 111B, a cyan ink is stored in the ink chamber 111C, a magenta ink is stored in the ink chamber 111M, and a yellow ink is stored in the ink chamber 111Y. Each color ink is an example of a liquid. However, the number of ink chambers 111 and the colors of inks are not restricted to the number and the colors in the abovementioned example. The ink chambers 111 are arranged along the left-right direction 9. Moreover, in the four ink chambers 111B, 111M, 111C, and 111Y, the ink chamber 111B is arranged at the extreme right side and the ink chamber 111Y is arranged at the extreme left side. Furthermore, the ink chamber 111B has a volume larger than a volume of each of another ink chambers 111M, 111C, and 111Y.

<Inlet 112>

The inclined wall 101B of the ink tank 100 is provided with inlets 112B, 112M, 112C, and 112Y (hereinafter, collectively referred to as "inlets 112") through which the inks are poured into the ink chambers 111 respectively. The inlets 112 are arranged in the left-right direction 9. Each of the inlets 112 runs through a thickness direction of the inclined wall 101B, and communicates one of the ink chambers 111 with an exterior of the ink tank 100. An inner surface of the inclined wall 101B faces the ink chamber 111, and an outer surface of the inclined wall 101B faces the exterior of the ink tank 100. Consequently, the inlets 112 communicate the ink chambers 111 with the exterior of the ink tank 100 directly. In other words, between each of the inlets 112 and one of the ink chambers 111, there is no channel having a cross-sectional area smaller than a cross-sectional area of the inlet 112, and which is bent.

The inclined wall 101B and the inlets 112 provided for the inclined wall 101B, as shown in FIG. 1B, are exposed to an exterior of the multi-function peripheral 10 via the opening 22 by positioning the cover 70 at an exposed position. In the present embodiment, a posture of the ink tank 100 when the inks are poured into the ink chambers 111 through the inlets 112 (pouring posture) is a posture of the ink tank 100 when the multi-function peripheral 10 is in a usable posture. In other words, when the multi-function peripheral 10 is in the usable posture, the inks are poured into the ink chambers 111 through the inlets 112 respectively.

The inlets 112 are formed in the inclined wall 101B of the ink tank 100 and directed to be inclined upward toward an outer side of the casing 14. In other words, a virtual plane including the inlets 112 is along the inclined wall 101B, and is inclined with respect to the up-down direction 7 and the front-rear direction 8, and a direction orthogonal to the virtual plane and directed outward of the ink tank 100 from the inlet 112 is an upward inclined direction.

The ink tank 100 has caps 113B, 113M, 113C, and 113Y (hereinafter, collectively referred to as "caps 113") that are detachable from the inlets 112 respectively. As shown in FIG. 1A, the caps 113 attached to the inlets 112 block the inlets 112 by making close contacts with peripheries of the inlets 112 respectively. Whereas, as shown in FIG. 1B, the caps 113 removed from the inlets 112 open the inlets 112. The caps 113 are attached to and detached from the inlets 112 respectively in a state that the cover 70 is positioned at the exposed position. Moreover, by detaching the caps 113 from the inlets 112, it is possible to pour the inks into the ink chambers 111.

<Ink Outflow Channel 114>

Figure 6:
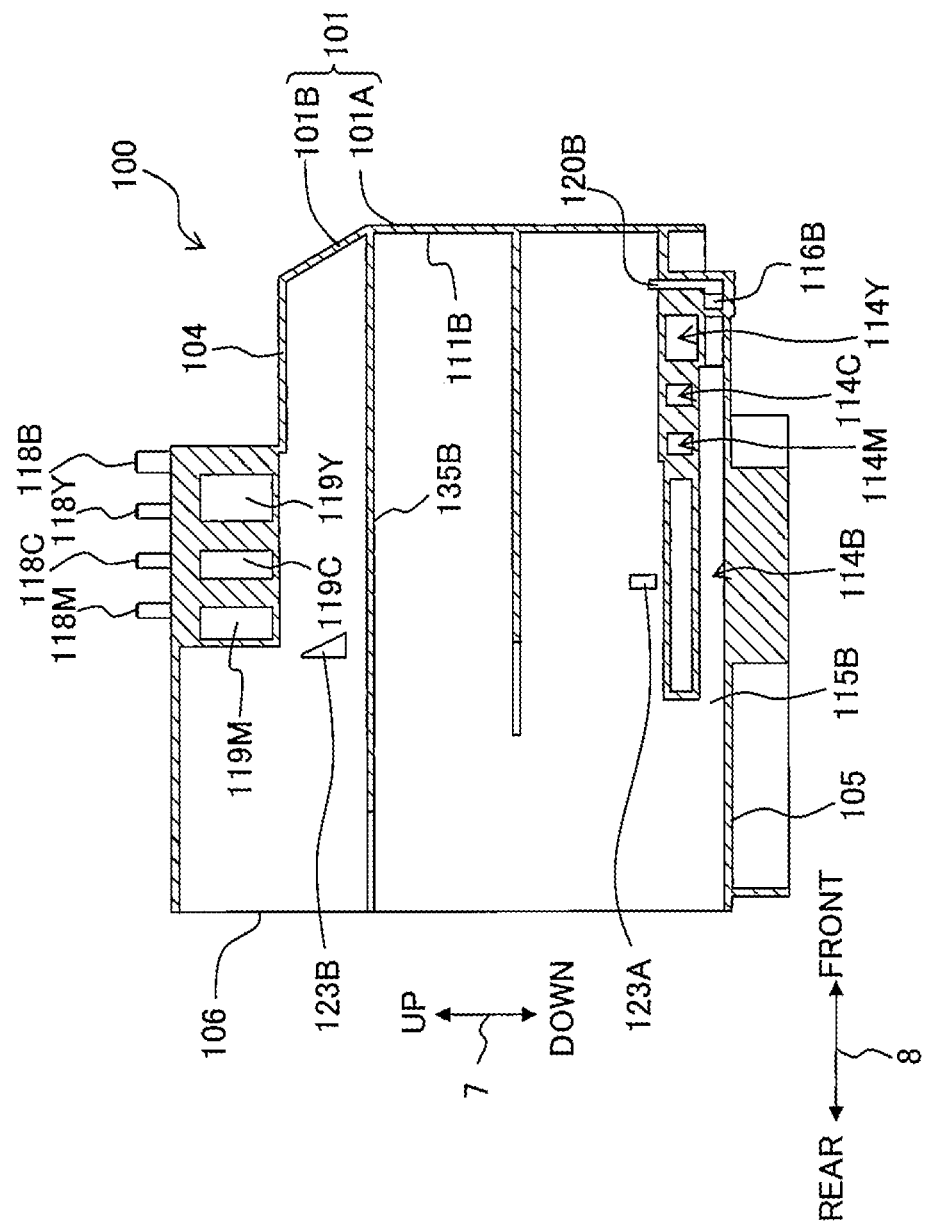
FIG. 6 is a cross-sectional view along a line VI-VI in FIG. 4.
Figure 9A:
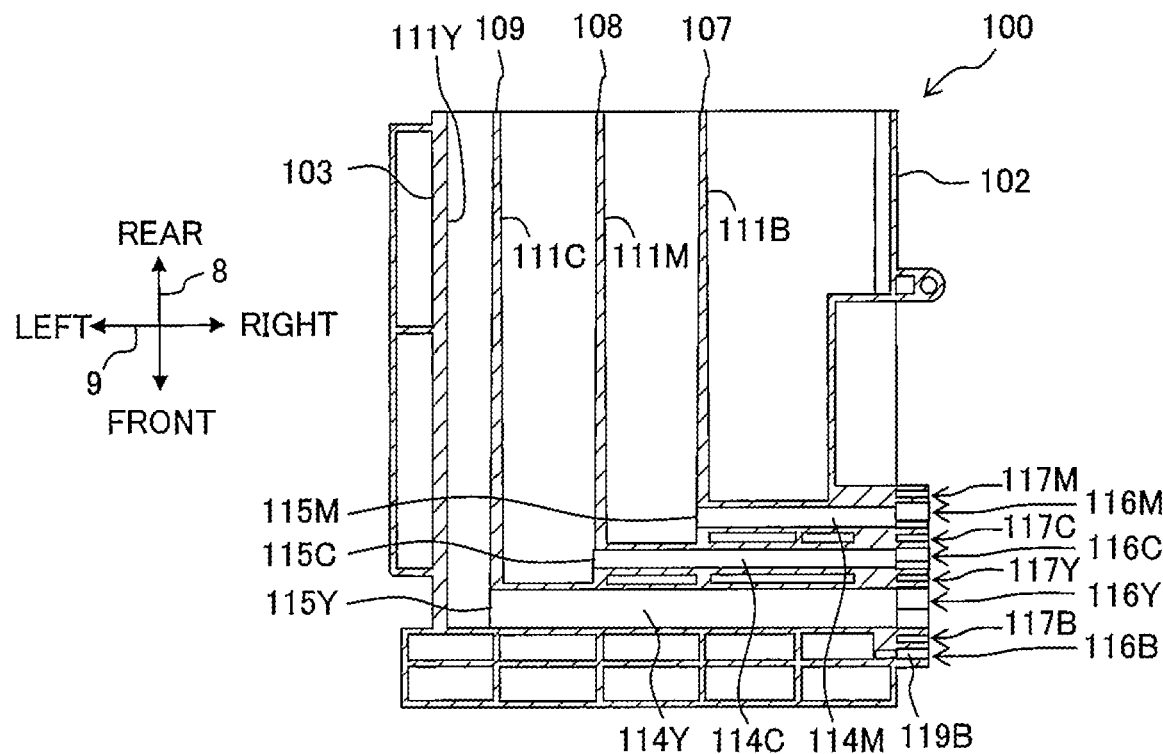
FIG. 9A is a cross-sectional view along a line IXA-IXA in FIG. 8.

Ink outflow channels 114B, 114M, 114C, and 114Y (hereinafter, collectively referred to as "ink outflow channels 114") (an example of a liquid outflow channel) are connected to the ink chambers 111 respectively as shown in FIG. 6 and FIG. 9A. Each of the ink outflow channel 114 is a channel which allows the ink stored in the corresponding ink chamber 111 to outflow to outside of the ink tank 100. Each of the ink outflow channel 114 in the present embodiment is a channel running from the corresponding ink chamber 111 up to a right side surface of the ink tank 100 (in other words, an outer surface of the right wall 102).

The ink outflow channel 114Y communicates with the ink chamber 111Y through an opening 115Y (refer to FIG. 7) provided near a lower end of the partition wall 109 which defines a right surface of the ink chamber 111Y Moreover, the ink outflow channel 114Y reaches a right side surface of the ink tank 100 through an opening 116Y (refer to FIG. 8) provided in the right wall 102. More elaborately, the ink outflow channel 114Y, as shown in FIG. 9A, is extended to right along the left-right direction 9 from the opening 115Y on a front side of the ink chambers 111B, 111M, and 111C, and reaches the opening 116Y through the right wall 102 (in other words, reaches the right side surface of the ink tank 100).

The ink outflow channel 114C communicates with the ink chamber 111C through an opening 115C (refer to FIG. 7) provided near a lower end of a partition wall 108 which defines a right surface of the ink chamber 111C. Moreover, the ink outflow channel 114C reaches the right side surface of the ink tank 100 through an opening 116C (refer to FIG. 8) provided in the right wall 102. More elaborately, the ink outflow channel 114C, as shown in FIG. 9A, is extended to right along the left-right direction 9 from the opening 115C on a front side of the ink chambers 111B and 111M, and reaches the opening 116C through the right wall 102.

The ink outflow channel 114M communicates with the ink chamber 111M through an opening 115M (refer to FIG. 7) provided near a lower end of the partition wall 107 which defines a right surface of the ink chamber 111M. Moreover, the ink outflow channel 114M reaches the right side surface of the ink tank 100 through an opening 116M (refer to FIG. 8) provided in the right wall 102. More elaborately, the ink outflow channel 114M, as shown in FIG. 9A, is extended to right along the left-right direction 9 from the opening 115M on a front side of the ink chamber 111B, and reaches the opening 116M through the right wall 102.

The ink outflow channel 114B communicates with the ink chamber 111B through an opening 115B (refer to FIG. 7) provided near a boundary of the right wall 102 and the lower wall 105 which define a right surface and a bottom surface of the ink chamber 111B respectively. A partition wall 110 which intersects an inflow direction of the ink to the opening 115B (in other words, a downward direction of the up-down direction 7) is provided above the opening 115B. Moreover, the ink outflow channel 114B reaches the right side surface of the ink tank 100 through an opening 116B (refer to FIG. 8) provided in the right wall 102.

The ink outflow channel 114B, as shown in FIG. 6, is extended frontward along the front-rear direction 8 from the opening 115B, and reaches the opening 116B through the right wall 102 on a front side of the ink outflow channels 114M, 114C, and 114Y Moreover, the ink outflow channel 114B extended in the front-rear direction 8 intersects the ink outflow channels 114M, 114C, and 114Y each extended in the left-right direction 9. More elaborately, the ink outflow channel 114B is extended frontward below the ink outflow channels 114M, 114C, and 114Y extended in the left-right direction 9.

Figure 7:
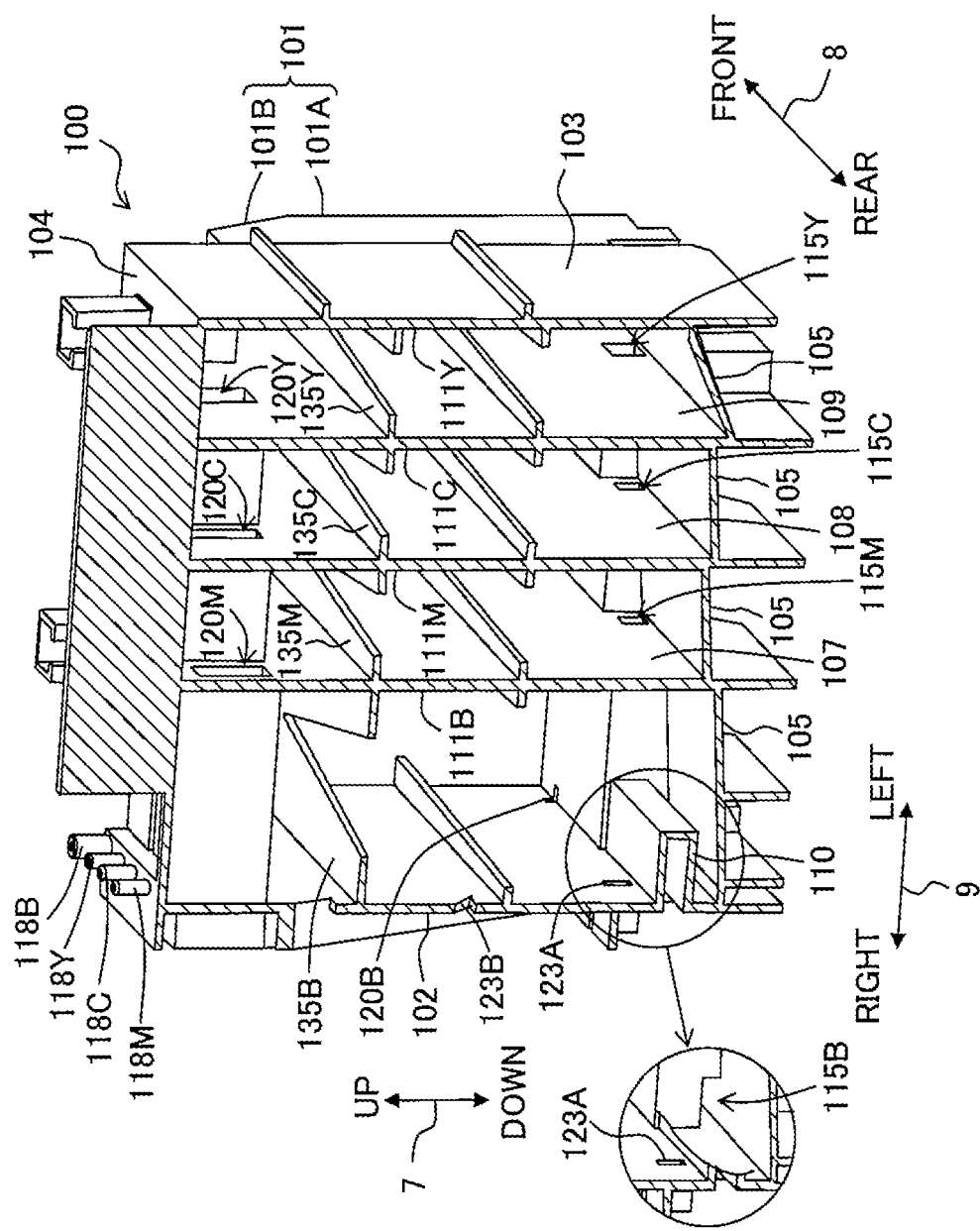
FIG. 7 is a perspective view of a cross-section along a line VII-VII in FIG. 4.
Figure 8:
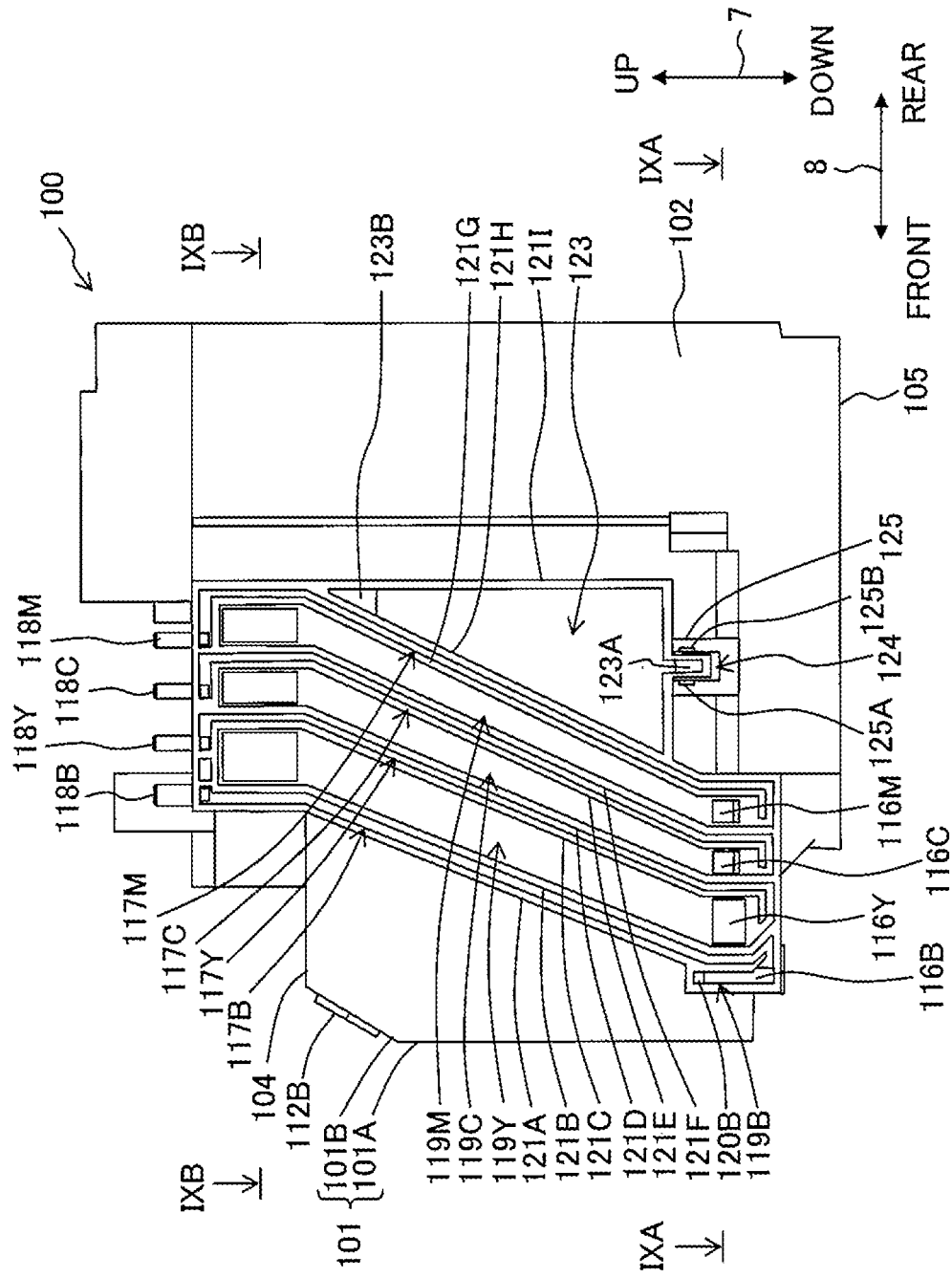
FIG. 8 is right side view of the ink tank.

In other words, the openings 115B, 115M, 115C, and 115Y which connect the corresponding ink chambers 111B, 111M, 111C, and 111Y to the ink outflow channels 114B, 114M, 114C, and 114Y respectively, as shown in FIG. 7, are provided at positions, which are located on a lower side of centers of the ink chambers 111B, 111M, 111C, and 111Y in the up-down direction 7 respectively, on a front side of centers of the ink chambers 111B, 111M, 111C, and 111Y in the front-rear direction 8 respectively, and on a right side of centers of the ink chambers 111B, 111M, 111C, and 111Y in the left-right direction 9 respectively. Moreover, the openings 116B, 116M, 116C, and 116Y, as shown in FIG. 8, are provided on the right side surface of the ink tank 100 at positions, which are located on a lower side of a center in the up-down direction 7 and on a front side of a center in the front-rear direction 8 of the ink tank 100. More elaborately, the openings 116 are provided to be adjacent in the front-rear direction 8 in order of the openings 116B, 116Y, 116C, and 116M from a front side to a rear side of the right side surface of the ink tank 100.

For each of the ink chambers 111, a center in the up-down direction 7 means a center of the maximum dimension along the up-down direction 7 (in the present embodiment, the maximum dimension along the up-down direction 7 between the upper wall 104 and the lower wall 105). A center in the front-rear direction 8 means a center of the maximum dimension along the front-rear direction 8 (in the present embodiment, the maximum dimension along the front-rear direction 8 between the front wall 101 and the film 106). A center in the left-right direction 9 means a center of the maximum dimension along the left-right direction 9 (in the present embodiment, the maximum dimension along the left-right direction 9 between the mutually adjacent partition walls 107, 108, and 109, between the right wall 102 and the partition wall 107, or between the left wall 103 and the partition wall 109). Similarly, the center of the ink tank 100 in the up-down direction 7 means a center of the maximum dimension along the up-down direction 7 of the ink tank 100. The center of the ink tank 100 in the front-rear direction 8 means a center of the maximum dimension along the front-rear direction 8 of the ink tank 100.

Moreover, volumes of ink outflow channels 114 from the openings 115 up to the openings 116 are different from each other. In the present embodiment, a volume of the ink outflow channel 114Y between the opening 115Y and the opening 116Y is the largest. A volume of the ink outflow channel 114C between the opening 115C and the opening 116C is the second largest. A volume of the ink outflow channel 114M between the opening 115M and the opening 116M is the third largest. A volume of the ink outflow channel 114B between the opening 115B and the opening 116B is the smallest. There are various causes that make the volumes of the ink outflow channels 114 different. For instance, the difference in volumes is caused due to a length of each of the ink outflow channels 114 in the left-right direction 9, or due to a cross-sectional area of each of the ink outflow channels 114 that is orthogonal to the left-right direction 9.

Furthermore, the maximum outflow amount of inks per unit time through the ink outflow channels 114 is set to be larger than the maximum amount of inks jetted per unit time through the nozzles 40 of the recording head 39. The maximum outflow amount, for instance, is determined by the cross-sectional areas of the ink outflow channels 114 orthogonal to the left-right direction 9.

<Ink Deriving Channel 117 and Return Channel 119>

Ink deriving channels 117B, 117M, 117C, and 117Y (hereinafter, collectively referred to as "ink deriving channels 117") (an example of a liquid deriving channel) are provided in the right side surface of the ink tank 100 as shown in FIG. 8. One end of each of the ink deriving channels 117B, 117M, 117C, and 117Y is connected to one of the corresponding ink outflow channels 114B, 114M, 114C, and 114Y at a position of one of the corresponding openings 116B, 116M, 116C, and 116Y, and the other end of each of the ink deriving channels 117B, 117M, 117C, and 117Y is connected to one of corresponding connecting portions 118B, 118M, 118C, and 118Y (hereinafter, collectively referred to as "connecting portions 118"). The four ink tubes 32B, 32M, 32C, and 32Y (refer to FIG. 3) (hereinafter, collectively referred to as "ink tubes 32") corresponding to inks of four colors are connected to the connecting portions 118 which are provided to be projected from the upper wall 104 of the ink tank 100. In other words, each of the ink deriving channels 117 is a channel that guides the ink flowed out from one of the corresponding ink chambers 111 through one of the corresponding ink outflow channels 114 to the recording head 39 through one of the ink tubes 32 connected to one of the corresponding connecting portions 118. A volume of each of the ink deriving channels 117 and a volume of each of the ink tubes 32 is substantially same.

Figure 9B:
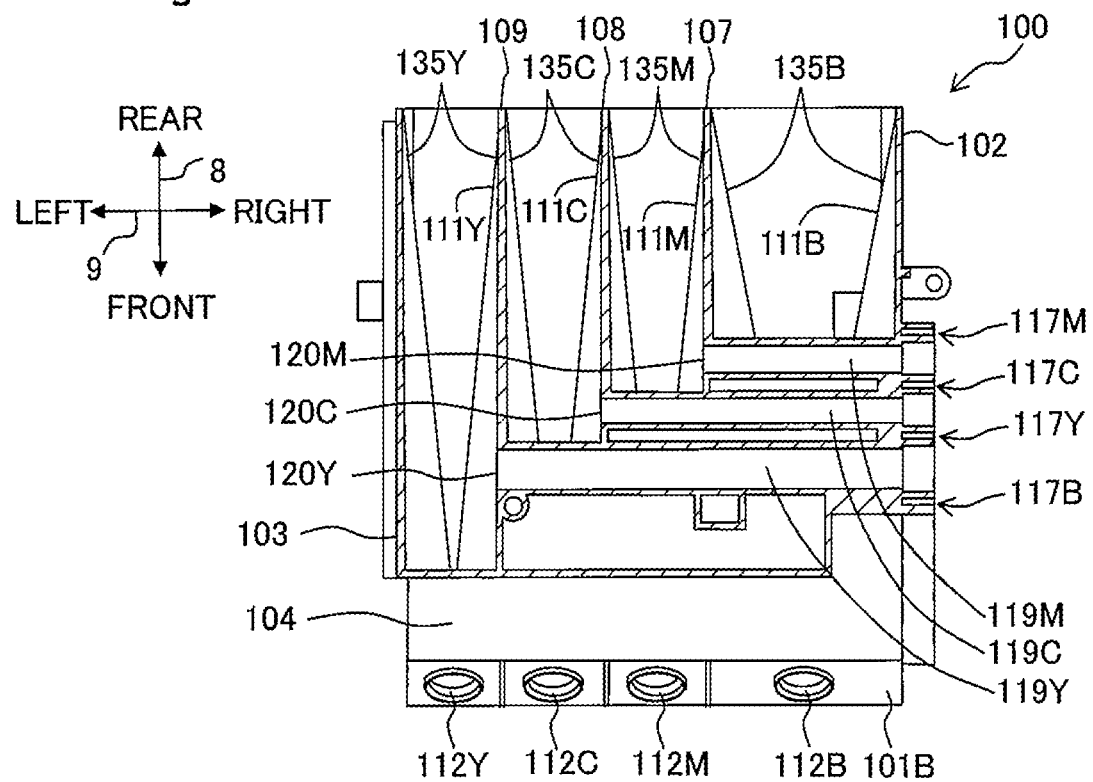
FIG. 9B is a cross-sectional view along a line IXB-IXB in FIG. 8.

Moreover, the right side surface of the ink tank 100, as shown in FIG. 8 and FIG. 9B, is provided with return channels 119B, 119M, 119C, and 119Y (hereinafter, collectively referred to as "return channels 119"). One end of each of the return channels 119B, 119M, 119C, and 119Y is connected to one of the corresponding ink outflow channels 114B, 114M, 114C, and 114Y, at a position of one of the corresponding openings 116B, 116M, 116C, and 116Y, and the other end of each of the return channels 119B, 119M, 119C, and 119Y communicates with one of the corresponding ink chambers 111 through one of corresponding openings 120B, 120M, 120C, and 120Y (hereinafter, collectively referred to as "openings 120"). The openings 116 and the openings 120 are provided at different positions in the up-down direction 7. More elaborately, the openings 120 are provided at an upper side in the up-down direction 7 of the corresponding openings 116.

Moreover, the openings 120 are provided at positions, which are located on an upper side of the centers of the corresponding ink chambers 111 in the up-down direction 7 (excluding the opening 120B). More preferably, the openings 120 are provided at positions, which are located on an upper side of liquid levels of the inks inside the corresponding ink chambers 111 (excluding the opening 120B), a rear side (an example of a third direction) of the corresponding opening 116 in the front-rear direction 8 (excluding the opening 120B), and a left side (an example of a fourth direction) of the corresponding opening 116 in the left-right direction 9. In other words, each of the return channels 119 is extended upward in the up-down direction 7, and is extended rearward in the front-rear direction 8 from one of the openings 116, and is further extended leftward in the left-right direction 9 to reach one of the openings 120 (excluding the return channel 119B).

The right wall 102 of the ink tank 100, as shown in FIG. 8, is provided with a plurality of projected walls 121A to 121I (the plurality of projected walls 121A to 121I will sometimes be collectively referred to as "projected walls 121"). Each of the projected walls 121 is projected to right from an outer surface (right side surface) of the right wall 102, and is extended along the outer surface of the right wall 102. Moreover, a film 122 is welded to a right-side front end of each of the projected walls 121. The single (common) film 122 is welded to the projected walls 121A to 121I. The ink deriving channels 117 and the return channels 119 are spaces defined by the film 122 and the adjacent projected walls 121A to 121H.

The projected walls 121A and 121B which define the ink deriving channel 117B are extended rearward from a position sandwiching the opening 116B, and are further extended upward to reach an upper end portion of the ink tank 100. The projected walls 121C and 121D which define the ink deriving channel 117Y, the projected walls 121E and 121F which define the ink deriving channel 117C, and the projected walls 121G and 121H which define the ink deriving channel 117M are extended downward from positions sandwiching the corresponding openings 116Y, 116C, and 116M respectively, and are further extended upward at a rear side of the openings 116Y, 116C, and 116M to reach the upper end portion of the ink tank 100. In other words, the ink deriving channels 117Y, 117C, and 117M are connected to the corresponding ink outflow channels 114Y, 114C, and 114M respectively, at lower portions (refers to a lower side of the center in the up-down direction 7) of the openings 116Y, 116C, and 116M. Furthermore, each of the ink deriving channels 117 is connected to one of the corresponding connecting portions 118 through a space (omitted in the diagram) extended in the up-down direction 7 and the left-right direction 9 inside the ink tank 100.

The projected walls 121A and 121B which define the return channel 119B, the projected walls 121B and 121C which define the return channel 119Y, the projected walls 121D and 121E which define the return channel 119C, and the projected walls 121F and 121G which define the return channel 119M are extended upward from positions sandwiching the corresponding openings 116. In other words, the return channels 119 are connected to the corresponding ink outflow channels 114 at upper portions (refers to an upper side of the center in the up-down direction 7) of the openings 116. Moreover, each of the return channels 119, as shown in FIG. 9B, is extended leftward in the left-right direction 9 inside the ink tank 100, and communicates with one of the corresponding ink chambers 111 through one of the corresponding openings 120.

In the present embodiment, a channel resistance of each of the return channels 119Y, 119C, and 119M is set to be higher than a channel resistance of one of the corresponding ink outflow channels 114Y, 114C, and 114M. There are various methods for changing the channel resistance. For example, it is possible to increase the channel resistance by increasing a length of the channel, by reducing a cross-sectional area of the channel, or by combining the two.

<Additional Ink Chamber 123>

Furthermore, the right side surface of the ink tank 100, as shown in FIG. 8, is provided with an additional ink chamber 123 (an additional storage chamber). The additional ink chamber 123 is a space which is define by the film 122 and the projected walls 121H and 121I continued in a peripheral direction. The additional ink chamber 123 communicates with the ink chamber 111B via through holes 123A and 123B in the right wall 102. The through hole 123B is provided at an upper side of the through hole 123A in the up-down direction 7. A detection portion 124 is formed on the additional ink chamber 123, by a part of the projected wall 121I which defines a lower end of the additional ink chamber 123 surrounding a front side, a rear side, and a lower side of the through hole 123A.

<Optical Sensor 125>

The multi-function peripheral 10, as shown in FIG. 4 and FIG. 8, includes an optical sensor 125 having a light emitting portion 125A and a light receiving portion 125B facing mutually in the front-rear direction 8, while sandwiching the detection portion 124 therebetween. The light emitting portion 125A outputs light that is transmitted through the projected wall 121I, but is not transmitted through the black ink (such as visible light and infrared light) toward the light receiving portion 125B. The light receiving portion 125B outputs, to the control section, a high-level signal (refers to a signal having a signal level above a threshold value) in response to receiving the light outputted from the light emitting portion 125A. On the other hand, the light receiving portion 125B outputs, to the control section, a low-level signal (refers to a signal having a signal level below the threshold value) in response to not receiving the light.

<Atmosphere Communicating Channel 126>

Atmosphere communicating channels 126B, 126M, 126C, and 126Y (hereinafter, collectively referred to as "atmosphere communicating channels 126") are connected to the ink chambers 111 respectively as shown in FIG. 10B. Each of the atmosphere communicating channels 126 communicates one of the corresponding ink chambers 111 with the atmosphere. More elaborately, each of the atmosphere communicating channels 126 communicates with one of the corresponding ink chambers 111 through one of corresponding notches 127, and communicates with an exterior of the ink tank 100 through one of corresponding openings 132. Moreover, each of the atmosphere communicating channels 126 makes an air flow in and out between one of the corresponding ink chambers 111 and the exterior of the ink tank 100 through one of the corresponding notches 127, one of corresponding first through holes 128, one of corresponding labyrinths 129, one of corresponding second through holes 130, one of corresponding gas passages 131, and one of the corresponding openings 132.

Each of the notches 127 is provided at a position, which is located on an upper side of the center in the up-down direction 7, a rear side of the center in the front-rear direction 8, and a left side of the center in the left-right direction 9, of one of the corresponding ink chambers 111. More elaborately, the notch 127B is defined by the upper wall 104, the film 106, and the partition wall 107. The notch 127M is defined by the upper wall 104, the film 106, and the partition wall 108. The notch 127C is defined by the upper wall 104, the film 106, and the partition wall 109. The notch 127Y is defined by the upper wall 104, the film 106, and the left wall 103. In other words, each of the notches 127 in the present embodiment is provided at an upper end, a rear end, and a left end of one of the corresponding ink chambers 111.

Moreover, a semipermeable membrane 133 is applied to the first through holes 128. The semipermeable film 133 is a porous film having micro holes, which blocks passing of inks and allows passing of gases, and is made of a fluoro-resin such as, polytetrafluoroethylene, polychlorotrifluoro-ethylene, tetrafluoroethylene-hexafluoropropylene copolymer, tetrafluoroethylene-perfluoro alkyl vinyl ether copolymer, and tetrafluoroethylene-ethylene copolymer. Furthermore, an upper side of the first through holes 128, the labyrinths 129, and the second through holes 130 is covered by a film 134.

<Partition Wall 135>

As shown in FIG. 7, FIG. 9A, and FIG. 9B, partition walls 135B, 135M, 135C, and 135Y (hereinafter, collectively referred to as "partition walls 135") each spread in the front-rear direction 8 and the left-right direction 9 are provided inside the ink chambers 111, respectively. Each of the partition walls 135 in the present embodiment is extended in a substantially horizontal direction. However, the partition walls 135 are not restricted to be extended only in the horizontal direction. For instance, the partition walls 135 may be inclined to descend toward rear side in the front-rear direction 8.

The partition wall 135B is connected to the erected wall 101A, the right wall 102, the film 106, and the partition wall 107. The partition wall 135M is connected to the erected wall 101A, the film 106, and the partition walls 107 and 108. The partition wall 135C is connected to the erected wall 101A, the film 106, and the partition walls 108 and 109. The partition wall 135Y is connected to the erected wall 101A, the left wall 103, the film 106, and the partition wall 109. In other words, each of the partition walls 135 is provided at a lower side of one of the inlets 112 inside one of the corresponding ink chambers 111. Moreover, each of the partition walls 135 divides a part of one of the corresponding ink chambers 111 in the up-down direction 7. In other words, each of the partition walls 135 is away from the upper wall 104 and the lower wall 105, and there are spaces on the upper side and the lower side in the up-down direction of each of the partition walls 135. Since the partition walls 135B, 135M, 135C, and 135M have substantially the same shape, the partition wall 135M will be described below in detail by referring to FIG. 11 and FIG. 12.

Figure 11:
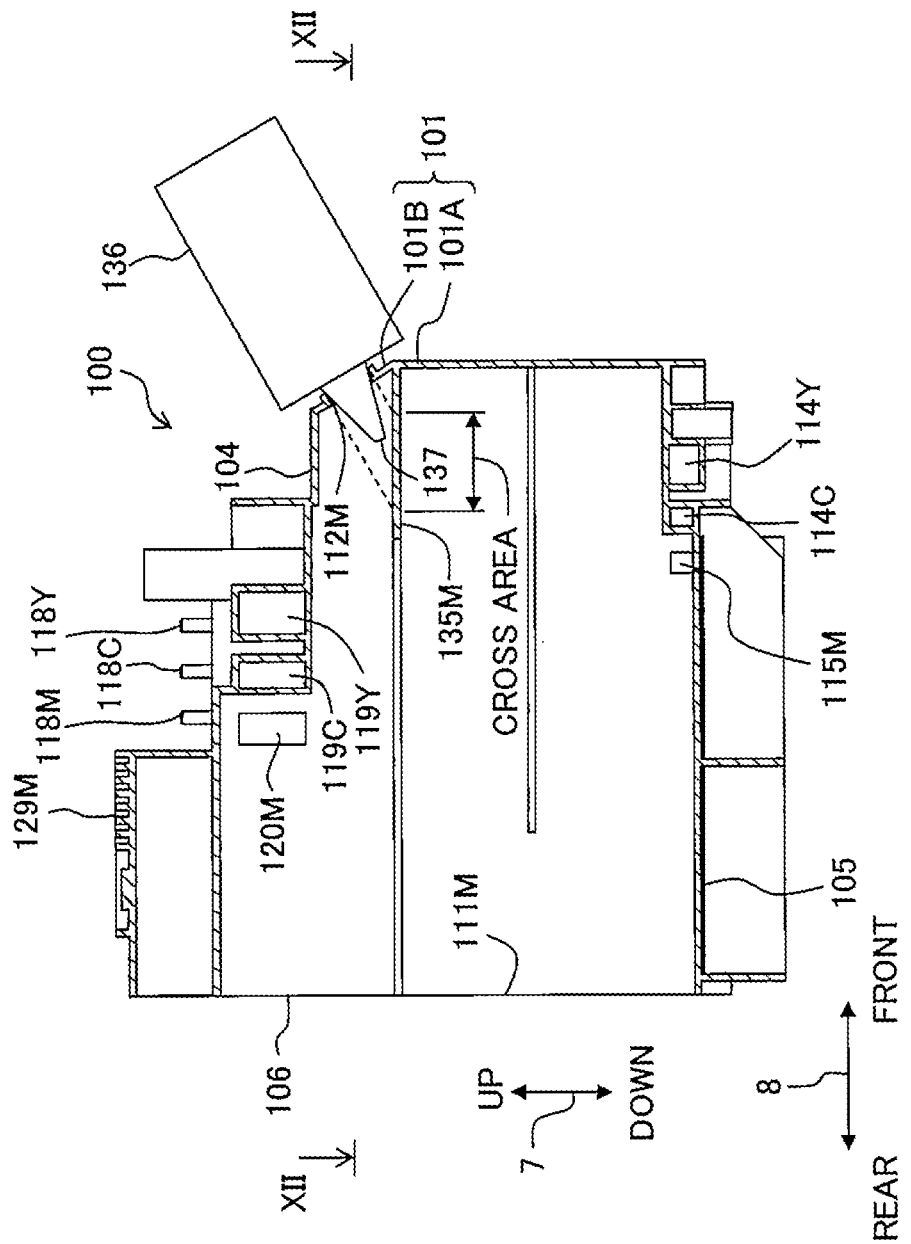
FIG. 11 is a cross-sectional view along a line XI-XI in FIG. 10A.

The partition wall 135M, as shown in FIG. 11, is provided at least for a cross area. As an example, the cross area can be defined as a region that intersects a virtual line (broken line in FIG. 11) passing through the inlet 112M and orthogonal to the inclined wall 101B. As another example, the cross area can be defined as a region that intersects a virtual line passing through the inlet 112M and extended in a direction of passing through the inlet 112M. As still another example, the cross area can be defined as a region intersecting an outflow direction of an ink that is flowed out from a supply port 137 of an ink bottle 136 (an example of a liquid supply container), that has been positioned upon entering into the ink chamber 111M through the inlet 112M. In other words, the partition wall 135M is provided in an area through which the ink poured into the ink chamber 111M through the inlet 112M passes. In other words, a majority of the ink poured into the ink chamber 111M through the inlet 112M collides with the partition wall 135M.

Figure 12:
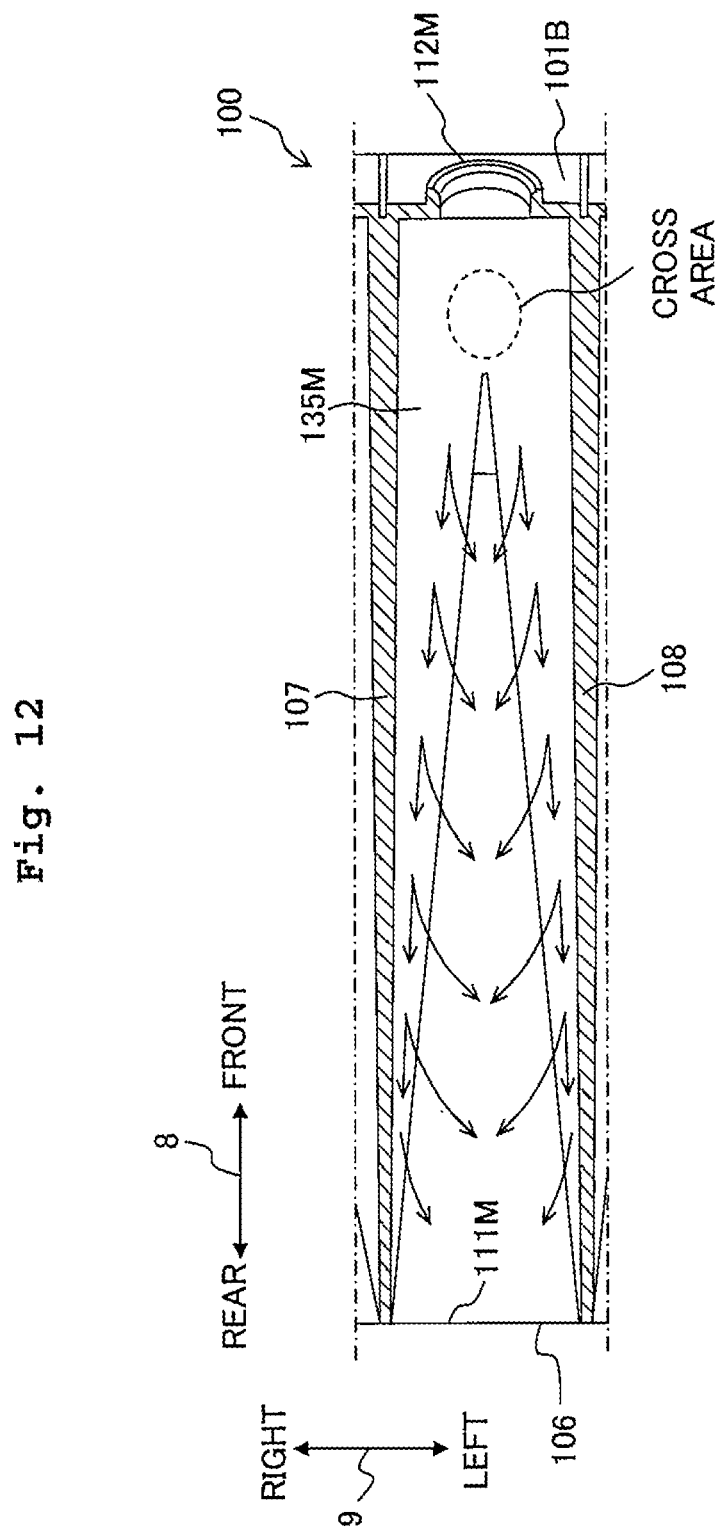
FIG. 12 is a cross-sectional view along a line XII-XII in FIG. 11.

The partition wall 135M, as shown in FIG. 12, is provided for an entire area on a front side of the cross area in the front-rear direction 8 (or in other words, on a side near the inlet 112M in the horizontal direction). In other words, the partition wall 135 is extended continuously at the entire area on the front side of the cross area to be connected to the erected wall 101A and the partition walls 107 and 108 without any gap. In other words, the partition wall 135M divides the ink chamber 111M in the up-down direction 7 in the entire area on the front side of the cross area. Moreover, the partition wall 135M is also extended toward a rear side of the cross area in the front-rear direction 8 (in other words, a side far from the inlet 112 in the horizontal direction).

However, a part of the partition wall 135M on the rear side of the cross area is opened. An area of an opening (in an example in FIG. 12, a width of the opening in the left-right direction 9) provided for the partition wall 135M increases toward a side far from the inlet 112M. Moreover, a shape of the opening is symmetrical with respect to a direction of moving away from the inlet 112M along the partition wall 135M (in other words, rearward in the front-rear direction 8). The shape of the opening in the present embodiment is an isosceles triangular shape with a vertex of the isosceles triangle directed frontward.

<Arrangement of Ink Tank 100>

The ink tank 100 having the abovementioned arrangement, as shown in FIG. 2, is arranged below the lower surface of the carriage 23 (in other words, the nozzle surface). More elaborately, an inner surface of the upper wall 104 that defines the upper surface of the ink chamber 111 (in other words, a top surface of the ink chamber 111) is positioned below the nozzle surface. Even more elaborately, a lower end of each of the inlets 112 is positioned below the nozzle surface. In other words, the liquid level of the ink inside each of the ink chambers 111 in a usable state is positioned below the nozzle surface. Moreover, the ink tank 100, as shown in FIG. 2 and FIG. 3, is arranged in front of the guide rail 44, the carriage 23, and the nozzles 40 in the front-rear direction 8, or in other words, is arranged at a position shifted to the front side (an example of a first direction). More elaborately, the film 106 which defines rear surfaces of the ink chambers 111 is positioned in front of the nozzles 40.

Moreover, the ink tank 100, as shown in FIG. 3, is arranged outside (right side, in the embodiment) the conveying path 65 in the left-right direction 9, or in other words, arranged at a position deviated toward right side. More elaborately, an inner surface of the left wall 103 which defines a left surface of the ink chamber 111Y is arranged at a right side of the conveying path 65. In other words, all the ink chambers 111 are arranged at the right side of the conveying path 65.

Moreover, a part of the ink tank 100 is arranged at an inner side of both ends of a movement area in which the carriage 23 moves in the left-right direction 9. More elaborately, at least a part of the ink outflow channels 114 or the ink deriving channels 117 is positioned at a further right side of the nozzles 40 of the carriage 23 which is positioned at rightmost side (shown by alternate long and short dash lines in FIG. 3). In other words, the inks that flow out from the ink chambers 111 pass through the right side of the nozzles 40, and are supplied to the recording head 39. Moreover, the ink tank 100 is arranged in front of the carriage 23 in the front-rear direction 8.

[Action and Effect of Present Embodiment]

According to the present embodiment, since the ink tank 100 is arranged outside the conveying path 65 in the left-right direction 9, and a part of the ink tank 100 is arranged inside the both ends of the movement area of the carriage 23 in the left-right direction 9, it is possible to make an outer shape of the casing 14 in the left-right direction 9 small to realize small-sizing of the apparatus.

Moreover, since the ink tank 100 is arranged in front of the carriage 23 in the front-rear direction 8, the total length of the casing 14 in the left-right direction 9 is shorter than a length in which the dimension of the ink tank 100 is further added to the movement area of the carriage 23. Therefore, it is possible to make the outer shape of the casing 14 in the left-right direction 9 small to realize the small-sizing of the apparatus.

Furthermore, since each of the inlets 112 of the ink tank 100 is directed toward outside of the casing 14 and inclined upward, it is possible to allow a liquid to flow inward downward from the outside of the side wall of the casing 14 to each of the inlets 112. Accordingly, an access to the ink tank 100 at the time of replenishing the liquid is easy.

Since the opening 22 of the casing 14 is formed in the front wall 14A on the front side in the front-rear direction 8, it is possible to make an access to the ink tank 100 from the front side of the casing 14.

Moreover, since the casing 14 is provided with the cover 70 which opens and closes the opening 22, when it is not necessary to make an access to the ink tank 100, it is possible to prevent dust etc. from entering into the interior of the casing 14 by closing the opening 22.

The cover 70 is pivotable around the pivot axis 70A extended along the leftward-rearward direction 9, the pivot axis 70A is provided at a position nearer to the lower end 72 of the cover 70 than to the upper end 71 of the cover 70 in a state that the cover 70 closes the opening 22. Accordingly, it is easy to hold the cover 70 at a position at which the cover 70 opens the opening 22.

Moreover, since the operation panel 17 is arranged on the front wall 14A of the casing 14 at a position above the ink tank 100 in the up-down direction 7, it is possible to make a dimension of the casing 14 in the up-down direction 7 short to realize a thin apparatus.

Furthermore, since the feeding tray 20 can be drawn out frontward from the casing 14, the user is capable of making an access to the feeding tray 20 from the front side of the apparatus.

[Modified Example]

In the present embodiment, the opening 22 is formed on the right side of the front wall 14A of the casing 14, and the ink tank 100 is arranged at a rear side of the opening 22. However, the opening 22 may be formed on the left side of the front wall 14A, and the ink tank 100 may be arranged at a rear side of the opening 22. Moreover, the opening 22 may be formed on a right side wall or a left side wall instead of the front wall 14A of the casing 14, in order to make it possible to access the inlets 112 of the ink tank 100 from the right side or the left side of the casing 14.

Moreover, in the embodiment, the recording section 24 was positioned above the overall conveying path 65 from the feeding tray 20 up to the discharge tray 21 in the up-down direction 7. However, positioning of the recording section 24 is not restricted to such positioning. In other words, the recording section 24 may be positioned above a part of the conveying path 65 facing the recording section 24 in the up-down direction 7. For instance, the feeding tray 20 may be arranged above the recording section 24 in the up-down direction 7, and the conveying path 65 may be extended to descend from the feeding tray 20 toward a space between the recording section 24 and the platen 42.

Furthermore, in the embodiment, the ink has been described as an example of a liquid. However, the present teaching is not restricted to this. In other words, instead of ink, a pretreatment liquid which is to be jetted onto a recording paper before jetting an ink at the time of printing, or, water which is to be sprayed in the vicinity of the nozzles 40 of the recording head 39 for preventing drying of the nozzles 40 of the recording head 39 may be used as the liquid.

What is claimed is:

1. A liquid jetting apparatus comprising:
   a casing;
   a scanner disposed on a top of the casing;
   a tank positioned inside the casing and configured to store liquid, the tank having an inlet through the tank;
   a feeding tray from which a recording medium is fed;
   a conveying mechanism positioned inside the casing, the conveying mechanism configured to convey the recording medium fed from the feeding tray along a conveying path;
   a carriage positioned inside the casing above the conveying path, the carriage being configured to move in a movement direction so as to define a movement area having a range in the movement direction, the range of the movement area having first and second ends spaced apart in the movement direction;
   a recording head mounted on the carriage; and
   a discharge tray to which the recording medium having an image recorded by the recording head is discharged,
   wherein the tank is positioned outside the conveying path in the movement direction,
   wherein a first part of the tank is positioned between the first and second ends of the range of the movement area of the carriage in the movement direction,
   wherein a second part of the tank is positioned outside the first and second ends of the range of the movement area of the carriage in the movement direction, and
   wherein the feeding tray, the discharge tray, and the scanner are arranged in this order upwardly, and the discharge tray overlaps with the tank when viewed in the movement direction.

2. The liquid jetting apparatus according to claim 1, wherein the feeding tray is arranged at a position below the inlet of the tank in an up-down direction.

3. The liquid jetting apparatus according to claim 2, wherein the discharge tray is arranged at a position below the inlet of the tank in the up-down direction.

4. The liquid jetting apparatus according to claim 3, wherein the inlet of the tank is arranged at a position between an upper end of the carriage and the discharge tray in the up-down direction.

5. The liquid jetting apparatus according to claim 4,
   wherein the recording head has a nozzle surface formed with a nozzle configured to jet the liquid flowed out from the tank onto the recording medium conveyed by the conveying mechanism, and
   wherein the inlet of the tank is arranged at a position between the nozzle surface of the recording head and the discharge tray in the up-down direction.

6. The liquid jetting apparatus according to claim 1, wherein the scanner is arranged at a position above the inlet of the tank in an up-down direction.

7. The liquid jetting apparatus according to claim 1, further comprising an operation panel arranged at a position above the inlet of the tank in an up-down direction.

8. The liquid jetting apparatus according to claim 1,
   wherein the tank has a first side wall and a second side wall which face each other in the movement direction, a rear wall, and a connecting portion,
   wherein the liquid jetting apparatus further comprises a tube connected to the connecting portion,
   wherein the recording head has a nozzle configured to jet the liquid flowed out from the tank trough the tube onto the recording medium conveyed by the conveying mechanism, and
   wherein in the movement direction, a distance between a center of the connecting portion and the first side wall is shorter than a distance between a center of the inlet and the first side wall, and the distance between the center of the connecting portion and the first side wall is shorter than a distance between the center of the inlet and the second side wall.

9. The liquid jetting apparatus according to claim 8, wherein the second part of the tank includes the first side surface.

10. The liquid jetting apparatus according to claim 8, wherein the second part of the tank includes the connecting portion.

11. The liquid jetting apparatus according to claim 8, wherein the tube extends over the tank toward the recording head.

12. The liquid jetting apparatus according to claim 11, wherein the tube extends over one of the first side wall and the second side wall toward the recording head.

13. The liquid jetting apparatus according to claim 12, wherein the tube extends over the second side wall toward the head.

14. The liquid jetting apparatus according to claim 12, wherein the first part of the tank includes the one of the first side wall and the second side wall over which the tube extends.

15. The liquid jetting apparatus according to claim 12,
wherein the conveying path extends in a conveying direction which intersects with the movement direction, and
wherein the tube extends toward the recording head over a part, of the one of the first side wall and the second side wall, between the inlet and the rear wall in the conveying direction.

16. The liquid jetting apparatus according to claim 15,
wherein the tank further has an atmosphere open port configured to communicate an inside and an outside of the tank, and
wherein the tube extends toward the recording head over a part, of the one of the first side wall and the second side wall, between the inlet and the atmosphere open port in the conveying direction.

17. The liquid jetting apparatus according to claim 16, wherein the connecting portion is positioned between the inlet and the atmosphere open port in the conveying direction.

18. The liquid jetting apparatus according to claim 8,
wherein the tank further includes:
a film welded to one of the first side wall and the second side wall; and
a liquid outflow channel formed by the film and configured to allow the liquid to flow out from the tank.

19. A liquid jetting apparatus comprising:
a casing;
a tank positioned inside the casing and configured to store liquid, the tank having an inlet through the tank;
a conveying mechanism positioned inside the casing, the conveying mechanism configured to convey a recording medium along a conveying path;
a carriage positioned inside the casing above the conveying path, the carriage being configured to move in a movement direction so as to define a movement area having a range in the movement direction, the range of the movement area having first and second ends spaced apart in the movement direction;
a recording head mounted on the carriage; and
a discharge tray to which the recording medium having an image recorded by the recording head is discharged,
wherein the tank is positioned outside the conveying path in the movement direction,
wherein a first part of the tank is positioned between the first and second ends of the range of the movement area of the carriage in the movement direction,
wherein a second part of the tank is positioned outside the first and second ends of the range of the movement area of the carriage in the movement direction, and
wherein the discharge tray, the inlet of the tank, and an upper end of the carriage are arranged in this order upwardly, and the discharge tray overlaps with the tank when viewed in the movement direction.

* * * * *